US010178292B2

(12) United States Patent
Wexler et al.

(10) Patent No.: US 10,178,292 B2
(45) Date of Patent: Jan. 8, 2019

(54) WEARABLE APPARATUS WITH WIDE VIEWING ANGLE IMAGE SENSOR

(71) Applicant: ORCAM TECHNOLOGIES LTD., Jerusalem (IL)

(72) Inventors: Yonatan Wexler, Jerusalem (IL); Amnon Shashua, Mevaseret Zion (IL)

(73) Assignee: OrCam Technologies Ltd., Jerusalem (IL)

( * ) Notice: Subject to any disclaimer, the term of this patent is extended or adjusted under 35 U.S.C. 154(b) by 0 days.

(21) Appl. No.: 15/791,155

(22) Filed: Oct. 23, 2017

(65) Prior Publication Data

US 2018/0048800 A1 Feb. 15, 2018

Related U.S. Application Data

(63) Continuation of application No. 14/807,440, filed on Jul. 23, 2015, now Pat. No. 9,826,133.
(Continued)

(51) Int. Cl.
*H04N 5/225* (2006.01)
*H04N 5/232* (2006.01)
(Continued)

(52) U.S. Cl.
CPC ......... *H04N 5/2259* (2013.01); *G01S 3/7864* (2013.01); *G02B 27/0093* (2013.01); *G02B 27/017* (2013.01); *G06F 1/163* (2013.01); *G06F 1/1686* (2013.01); *G06F 1/18* (2013.01); *G06F 1/188* (2013.01); *G06F 3/005* (2013.01); *G06F 3/011* (2013.01); *G06F 3/012* (2013.01); *G06F 3/017* (2013.01); *G06F 3/0304* (2013.01); *G06F 3/038* (2013.01); *G06F 17/30277* (2013.01); *G06K 9/00201* (2013.01); *G06K 9/00208* (2013.01); *G06K 9/00221* (2013.01); *G06K 9/00288* (2013.01); *G06K 9/00335* (2013.01); *G06K 9/00624* (2013.01); *G06K 9/00671* (2013.01); *G06K 9/00677* (2013.01);
(Continued)

(58) Field of Classification Search
None
See application file for complete search history.

(56) References Cited

U.S. PATENT DOCUMENTS

2002/0113687 A1  8/2002  Center, Jr.
2009/0021191 A1  1/2009  McReynolds
(Continued)

*Primary Examiner* — Mark T Monk
(74) *Attorney, Agent, or Firm* — Finegan, Henderson, Farabow, Garrett & Dunner LLP

(57) ABSTRACT

A wearable apparatus and method are provided for capturing image data. In one implementation, a wearable apparatus for capturing image data is provided. The wearable apparatus includes at least one image sensor for capturing image data of an environment of a user, wherein a field of view of the image sensor includes a chin of the user. The wearable apparatus includes two or more microphones, and an attachment mechanism configured to enable the image sensor and microphones to be worn by the user. The wearable apparatus includes a processing device programmed to capture at least one image, identify the chin of the user to obtain a location of the chin, select a microphone from the two or more microphones based on the location, process input from the selected microphone using a first processing scheme, and process input from a microphone that is not selected using a second processing scheme.

12 Claims, 18 Drawing Sheets

Related U.S. Application Data

(60) Provisional application No. 62/027,936, filed on Jul. 23, 2014, provisional application No. 62/027,957, filed on Jul. 23, 2014.

(51) Int. Cl.
| | |
|---|---|
| H04N 5/235 | (2006.01) |
| G06T 7/00 | (2017.01) |
| G06T 7/73 | (2017.01) |
| G06K 9/00 | (2006.01) |
| G02B 27/00 | (2006.01) |
| G06F 1/18 | (2006.01) |
| G02B 27/01 | (2006.01) |
| G06F 3/01 | (2006.01) |
| G06Q 30/02 | (2012.01) |
| H04N 7/18 | (2006.01) |
| G06F 1/16 | (2006.01) |
| G06F 3/00 | (2006.01) |
| G06F 3/038 | (2013.01) |
| G06F 17/30 | (2006.01) |
| G06T 7/20 | (2017.01) |
| H04N 5/44 | (2011.01) |
| G01S 3/786 | (2006.01) |
| H04N 1/21 | (2006.01) |
| G06K 9/62 | (2006.01) |
| G06F 3/03 | (2006.01) |

(52) U.S. Cl.
CPC ....... *G06K 9/00718* (2013.01); *G06K 9/6262* (2013.01); *G06Q 30/0246* (2013.01); *G06Q 30/0257* (2013.01); *G06Q 30/0267* (2013.01); *G06Q 30/0269* (2013.01); *G06T 7/20* (2013.01); *G06T 7/74* (2017.01); *G06T 7/97* (2017.01); *H04N 1/2112* (2013.01); *H04N 5/2251* (2013.01); *H04N 5/2252* (2013.01); *H04N 5/2254* (2013.01); *H04N 5/2257* (2013.01); *H04N 5/2258* (2013.01); *H04N 5/2353* (2013.01); *H04N 5/23206* (2013.01); *H04N 5/23216* (2013.01); *H04N 5/23219* (2013.01); *H04N 5/23229* (2013.01); *H04N 5/23245* (2013.01); *H04N 5/23258* (2013.01); *H04N 5/44* (2013.01); *H04N 7/183* (2013.01); *H04N 7/185* (2013.01); *G02B 2027/014* (2013.01); *G02B 2027/0138* (2013.01); *G02B 2027/0178* (2013.01); *G02B 2027/0187* (2013.01); *G06F 2203/011* (2013.01); *G06K 2209/21* (2013.01); *G06K 2209/25* (2013.01); *G06T 2207/10004* (2013.01); *G06T 2207/10016* (2013.01); *G06T 2207/30232* (2013.01)

(56) References Cited

U.S. PATENT DOCUMENTS

| | | |
|---|---|---|
| 2009/0147126 A1 | 6/2009 | Miyoshi |
| 2009/0190914 A1 | 7/2009 | Scott |
| 2010/0262470 A1 | 10/2010 | Nielsen |
| 2011/0154141 A1 | 6/2011 | Tico |
| 2012/0147184 A1 | 6/2012 | Siann |
| 2012/0147204 A1 | 6/2012 | Jeong |

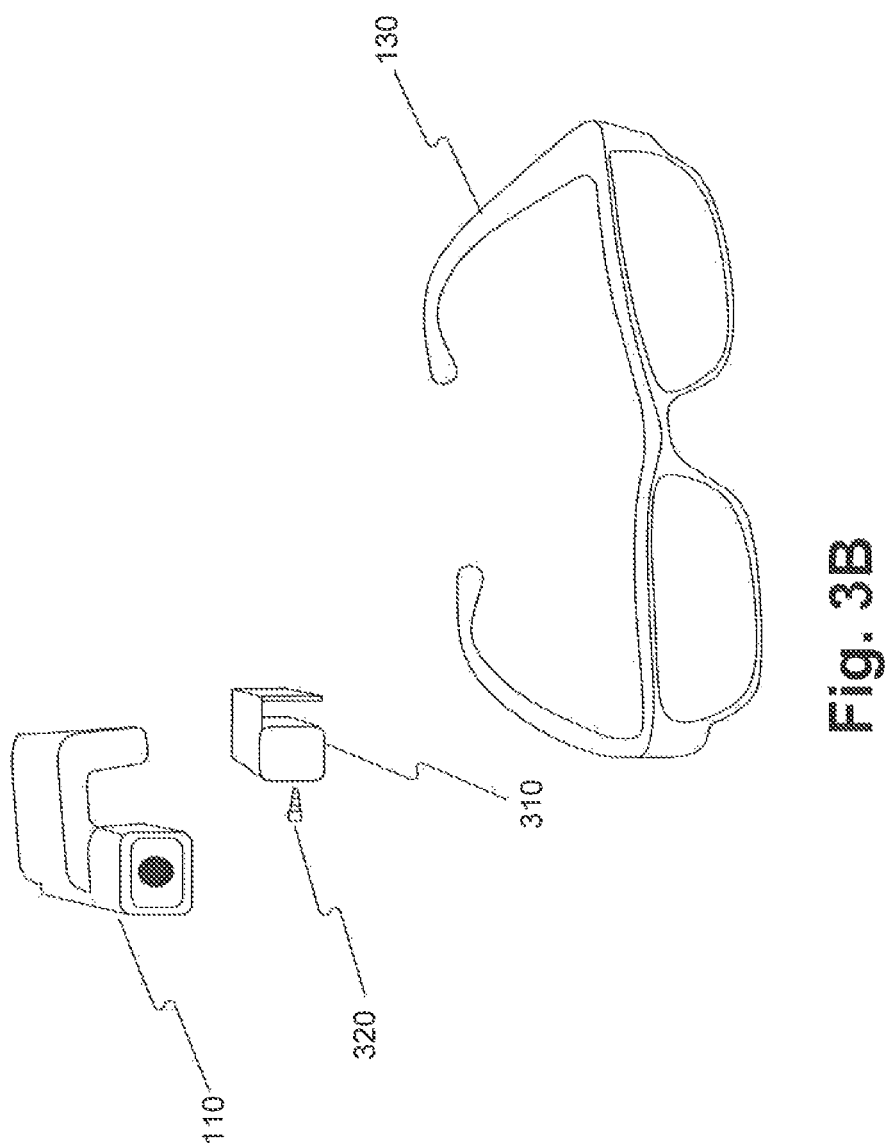

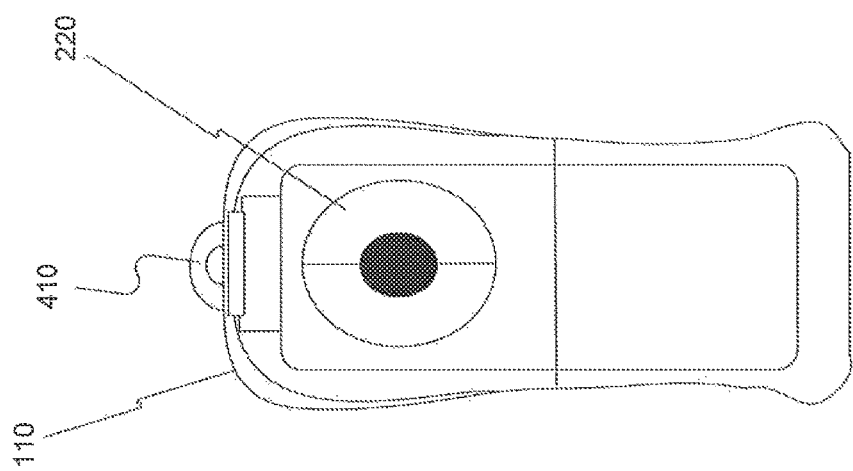

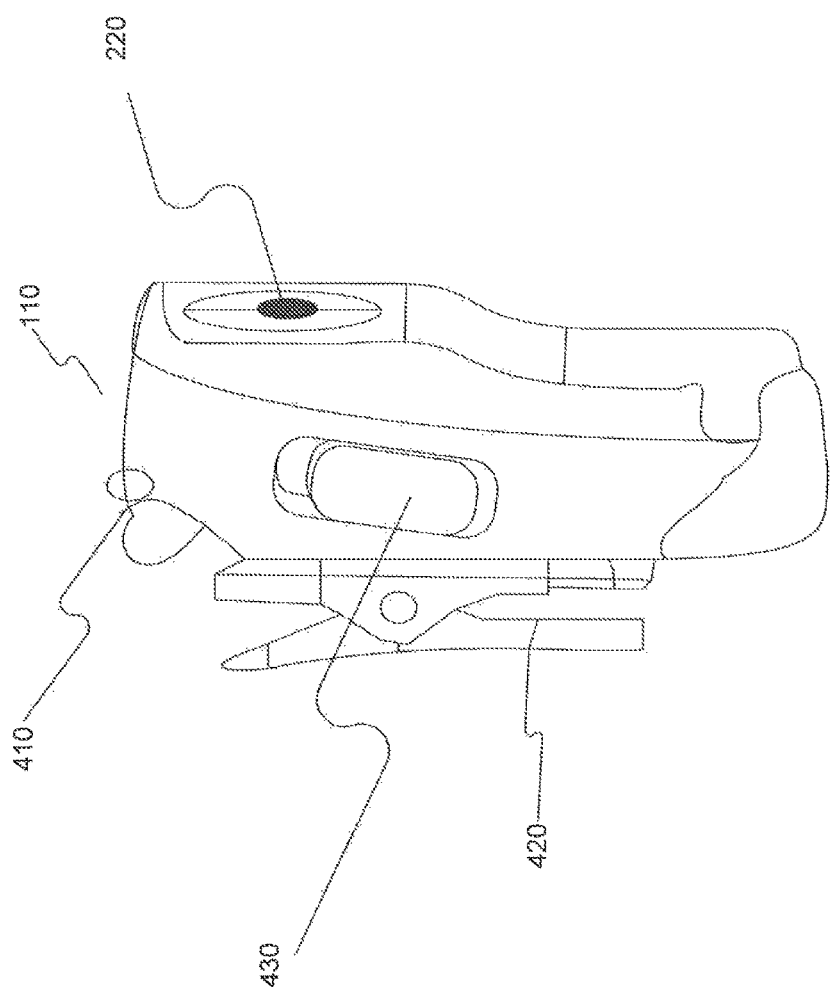

WEARABLE APPARATUS WITH WIDE VIEWING ANGLE IMAGE SENSOR

CROSS REFERENCES TO RELATED APPLICATIONS

This application is a continuation of U.S. patent application Ser. No. 14/807,440, filed on Jul. 23, 2015 (now allowed), which claims the benefit of priority of United States Provisional Patent Application No. 62/027,936, filed on Jul. 23, 2014, and United States Provisional Patent Application No. 62/027,957, filed on Jul. 23, 2014, all of which are incorporated herein by reference in their entirety.

BACKGROUND

I. Technical Field

This disclosure generally relates to devices and methods for capturing and processing images from an environment of a user. More particularly, this disclosure relates to a wearable apparatus including an image sensor having a wide viewing angle for capturing image data, and methods for processing the captured image data.

II. Background Information

Today, technological advancements make it possible for wearable devices to automatically capture images and store information that is associated with the captured images. Certain devices have been used to digitally record aspects and personal experiences of one's life in an exercise typically called "lifelogging." Some individuals log their life so they can retrieve moments from past activities, for example, social events, trips, etc. Lifelogging may also have significant benefits in other fields (e.g., business, fitness and healthcare, and social research). Lifelogging devices, while useful for tracking daily activities, may be improved with capability to enhance one's interaction in his environment with feedback and other advanced functionality based on the analysis of captured image data.

Even though users can capture images with their smartphones and some smartphone applications can process the captured images, smartphones may not be the best platform for serving as lifelogging apparatuses in view of their size and design. Lifelogging apparatuses should be small and light, so they can be easily worn. Moreover, with improvements in image capture devices, including wearable apparatuses, additional functionality may be provided to assist users in navigating in and around an environment. Therefore, there is a need for apparatuses and methods for automatically capturing and processing images in a manner that provides useful information to users of the apparatuses.

SUMMARY

Embodiments consistent with the present disclosure provide an apparatus and methods for automatically capturing and processing images from an environment of a user.

In accordance with a disclosed embodiment, a wearable apparatus for capturing image data is provided. The wearable apparatus includes at least one image sensor for capturing image data of an environment of a user, wherein a field of view of the image sensor includes at least a portion of a chin of the user. The wearable apparatus includes two or more microphones, and an attachment mechanism configured to enable the at least one image sensor and the two or more microphones to be worn by the user. The wearable apparatus includes at least one processing device programmed to capture at least one image using the at least one image sensor, identify the chin of the user in the at least one image to obtain a location of the chin of the user in the at least one image, and select at least one microphone from the two or more microphones based on the location of the chin of the user in the at least one image. The at least one processing device is also programmed to process input from the selected at least one microphone using a first processing scheme, and process input from at least one of the two or more microphones that are not selected using a second processing scheme.

In accordance with another disclosed embodiment, a wearable apparatus for capturing image data is provided. The wearable apparatus includes at least one image sensor for capturing image data of an environment of a user, and at least one microphone. The wearable apparatus includes an attachment mechanism configured to enable the at least one image sensor and the at least one microphone to be worn by the user. The wearable apparatus includes at least one processing device programmed to identify a direction of sound received by the at least one microphone, identify a portion of at least one image captured by the at least one image sensor based on the direction of the sound received by the at least one microphone, and process the identified portion of the at least one image.

In accordance with another disclosed embodiment, a wearable apparatus for capturing image data is provided. The wearable apparatus includes at least one image sensor for capturing image data of an environment of a user, wherein a field of view of the image sensor includes at least a portion of a chin of the user. The wearable apparatus includes an attachment mechanism configured to enable the at least one image sensor to be worn by the user. The wearable apparatus includes at least one processing device programmed to capture at least one image using the at least one image sensor, identify the chin of the user the in at least one image to obtain a location of the chin of the user in the at least one image, and identify a portion of the at least one image captured by the at least one image sensor based on the location of the chin of the user. The at least one processing device is also programmed to process the identified portion of the at least one image.

In accordance with another disclosed embodiment, a method is provided. The method includes processing at least one image captured using a wearable camera to identify a chin of a user in the at least one image to obtain a location of the chin of the user in the at least one image. The method also includes selecting at least one microphone from two or more microphones attached to the wearable camera based on the location of the chin of the user in the at least one image. The method also includes processing input from the selected at least one microphone using a first processing scheme, and processing input from at least one of the two or more microphones that are not selected using a second processing scheme.

In accordance with another disclosed embodiment, a method is provided. The method includes identifying a direction of sound received by at least one microphone attached to a wearable camera to obtain a sound direction, and capturing at least one image using a wearable camera. The method also includes identifying a portion of the at least one image based on the sound direction, and processing the identified portion of the at least one image.

In accordance with another disclosed embodiment, a method is provided. The method includes capturing at least one image using a wearable camera. The method also includes identifying a chin of a user in the at least one image to obtain a location of the chin of the user in the at least one image. The method also includes identifying a portion of the at least one image captured by the at least one image sensor based on the location of the chin of the user. The method further includes processing the identified portion of the at least one image.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 3B is an exploded view of the example of the wearable apparatus shown in FIG. 3A.

FIG. 4A is a schematic illustration of an example of the wearable apparatus shown in FIG. 1B from a first viewpoint.

FIG. 4B is a schematic illustration of the example of the wearable apparatus shown in FIG. 1B from a second viewpoint.

DETAILED DESCRIPTION

Figure 1A:
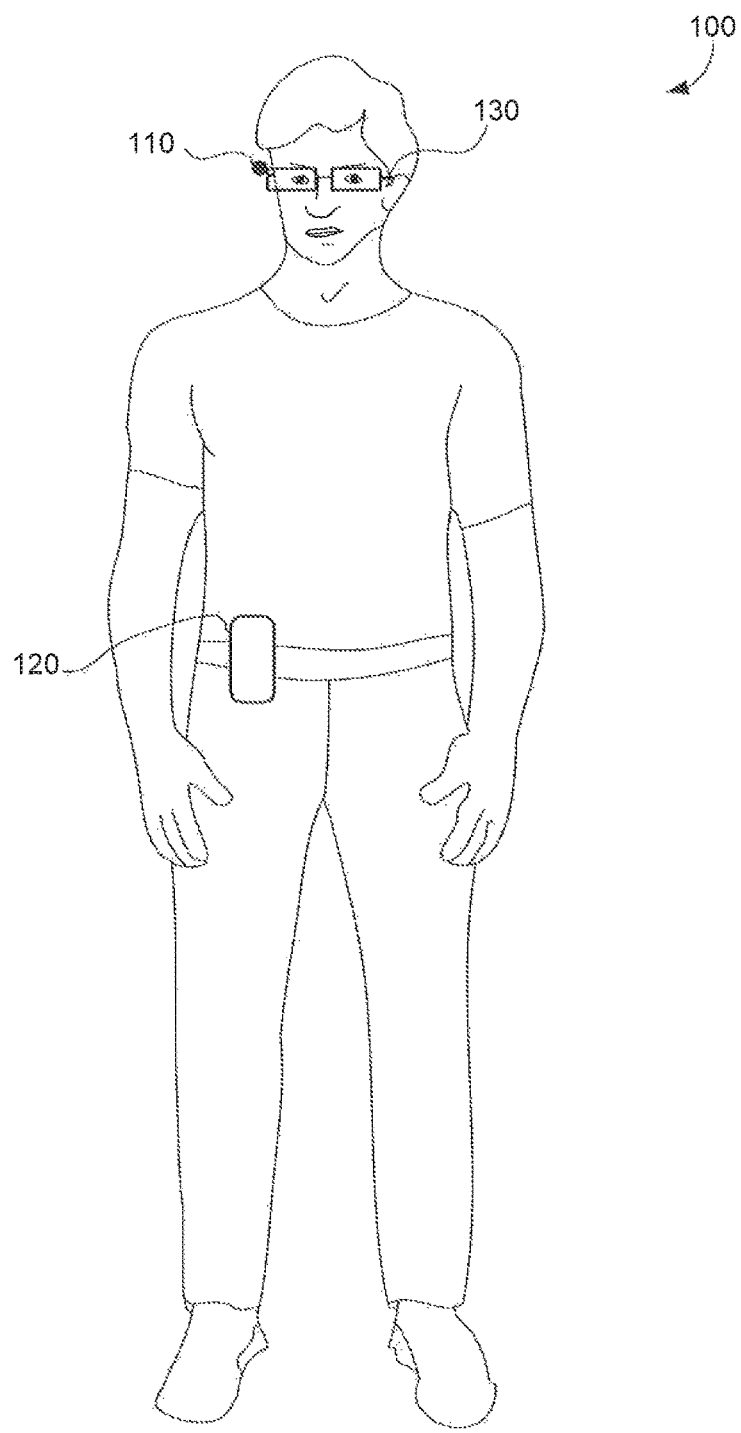
FIG. 1A is a schematic illustration of an example of a user wearing a wearable apparatus according to a disclosed embodiment.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1A illustrates a user 100 wearing an apparatus 110 that is physically connected (or integral) to glasses 130, consistent with the disclosed embodiments. Glasses 130 may be prescription glasses, magnifying glasses, non-prescription glasses, safety glasses, sunglasses, etc. Additionally, in some embodiments, glasses 130 may include parts of a frame and earpieces, nosepieces, etc., and one or more lenses. Thus, in some embodiments, glasses 130 may function primarily to support apparatus 110, and/or an augmented reality display device or other optical display device. In some embodiments, apparatus 110 may include an image sensor (not shown in FIG. 1A) for capturing real-time image data of the field-of-view of user 100. The term "image data" includes any form of data retrieved from optical signals in the near-infrared, infrared, visible, and ultraviolet spectrums. The image data may include video clips and/or photographs.

In some embodiments, apparatus 110 may communicate wirelessly or via a wire with a computing device 120. In some embodiments, computing device 120 may include, for example, a smartphone, or a tablet, or a dedicated processing unit, which may be portable (e.g., can be carried in a pocket of user 100). Although shown in FIG. 1A as an external device, in some embodiments, computing device 120 may be provided as part of wearable apparatus 110 or glasses 130, whether integral thereto or mounted thereon. In some embodiments, computing device 120 may be included in an augmented reality display device or optical head mounted display provided integrally or mounted to glasses 130. In other embodiments, computing device 120 may be provided as part of another wearable or portable apparatus of user 100 including a wrist-strap, a multifunctional watch, a button, a clip-on, etc. And in other embodiments, computing device 120 may be provided as part of another system, such as an on-board automobile computing or navigation system. A person skilled in the art can appreciate that different types of computing devices and arrangements of devices may implement the functionality of the disclosed embodiments. Accordingly, in other implementations, computing device 120 may include a Personal Computer (PC), laptop, an Internet server, etc.

Figure 1B:
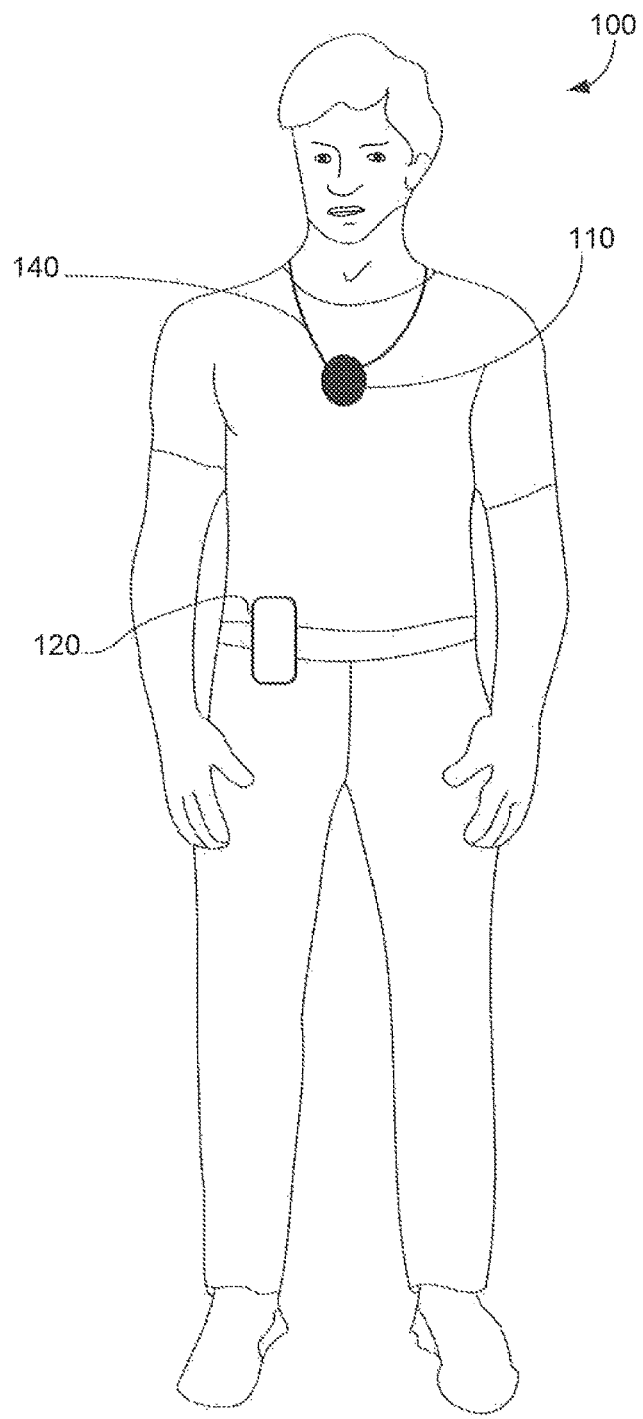
FIG. 1B is a schematic illustration of an example of the user wearing a wearable apparatus according to a disclosed embodiment.

FIG. 1B illustrates user 100 wearing apparatus 110 that is physically connected to a necklace 140, consistent with a disclosed embodiment. Such a configuration of apparatus 110 may be suitable for users that do not wear glasses some or all of the time. In this embodiment, user 100 can easily wear apparatus 110, and take it off.

Figure 1C:
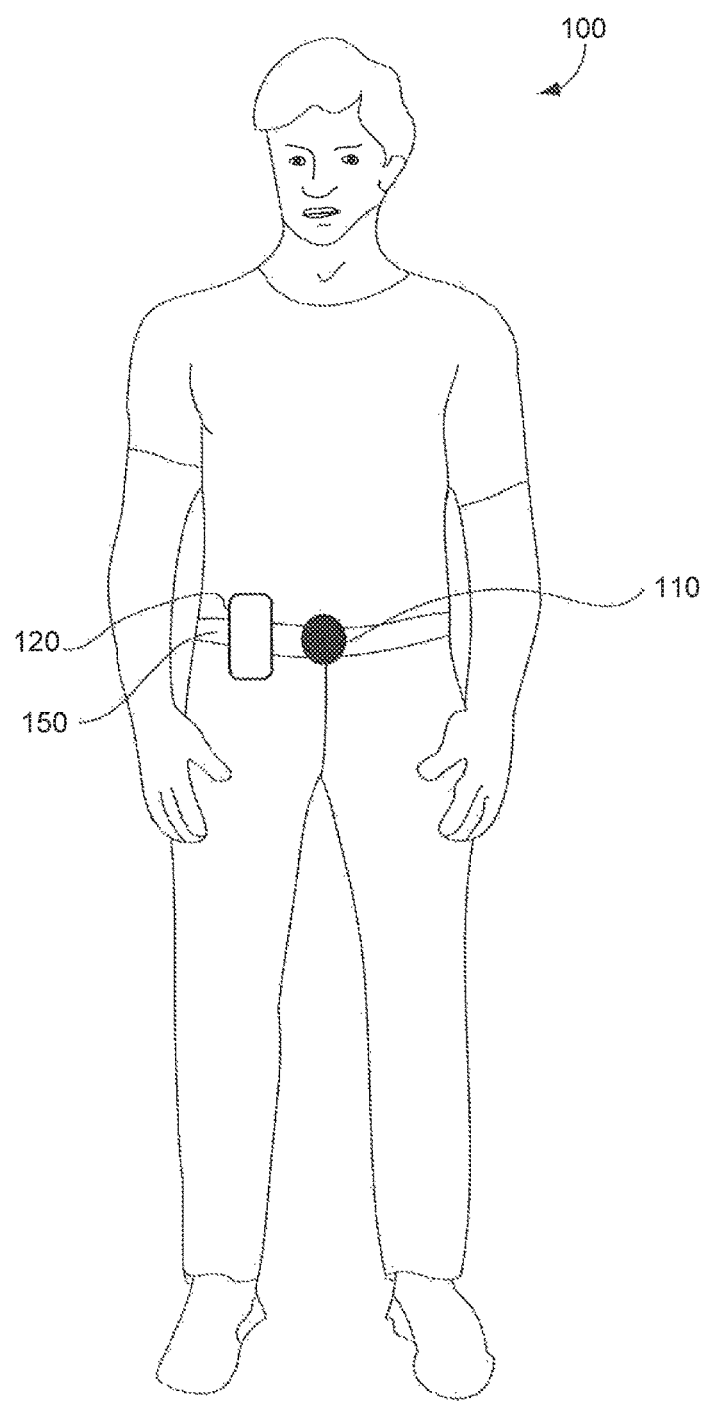
FIG. 1C is a schematic illustration of an example of the user wearing a wearable apparatus according to a disclosed embodiment.

FIG. 1C illustrates user 100 wearing apparatus 110 that is physically connected to a belt 150, consistent with a disclosed embodiment. Such a configuration of apparatus 110 may be designed as a belt buckle. Alternatively, apparatus 110 may include a clip for attaching to various clothing articles, such as belt 150, or a vest, a pocket, a collar, a cap or hat or other portion of a clothing article.

Figure 1D:
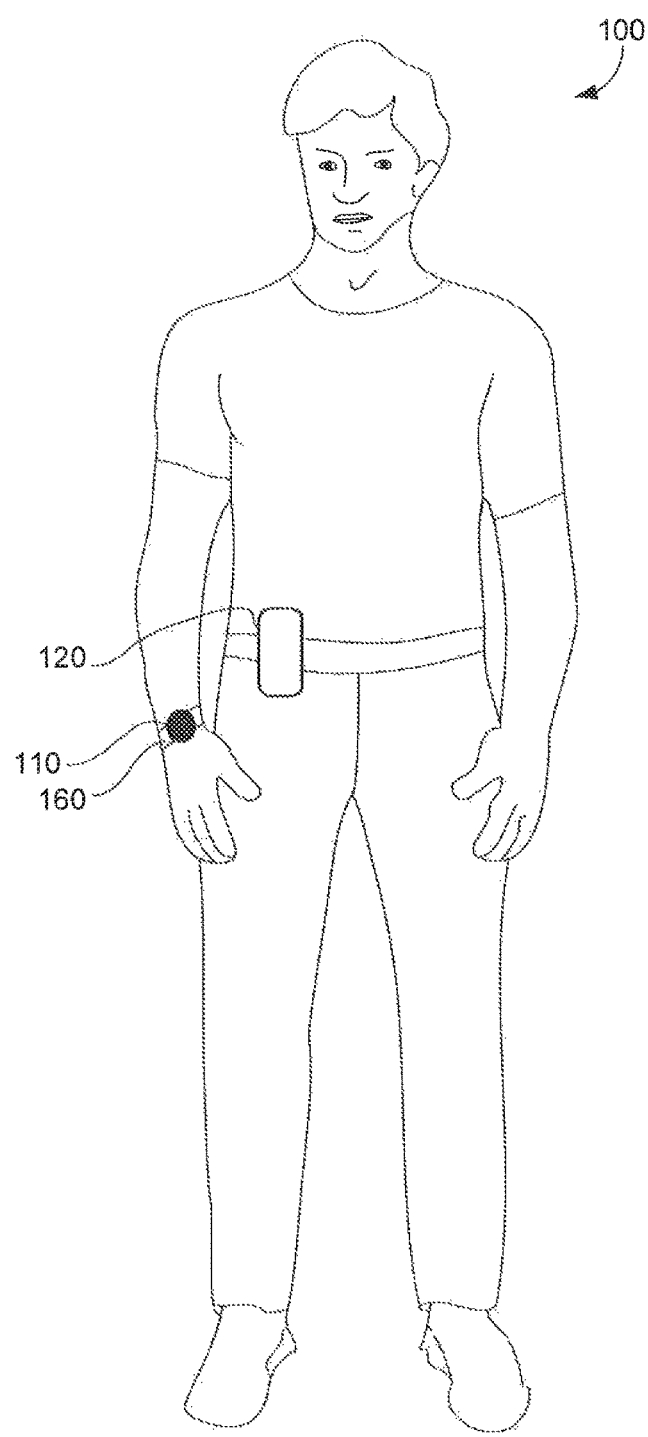
FIG. 1D is a schematic illustration of an example of the user wearing a wearable apparatus according to a disclosed embodiment.

FIG. 1D illustrates user 100 wearing apparatus 110 that is physically connected to a wrist strap 160, consistent with a disclosed embodiment. Although the aiming direction of apparatus 110, according to this embodiment, may not match the field-of-view of user 100, apparatus 110 may include the ability to identify a hand-related trigger based on the tracked eye movement of a user 100 indicating that user 100 is looking in the direction of the wrist strap 160. Wrist strap 160 may also include an accelerometer, a gyroscope, or other sensor for determining movement or orientation of a user's 100 hand for identifying a hand-related trigger.

Figure 2:
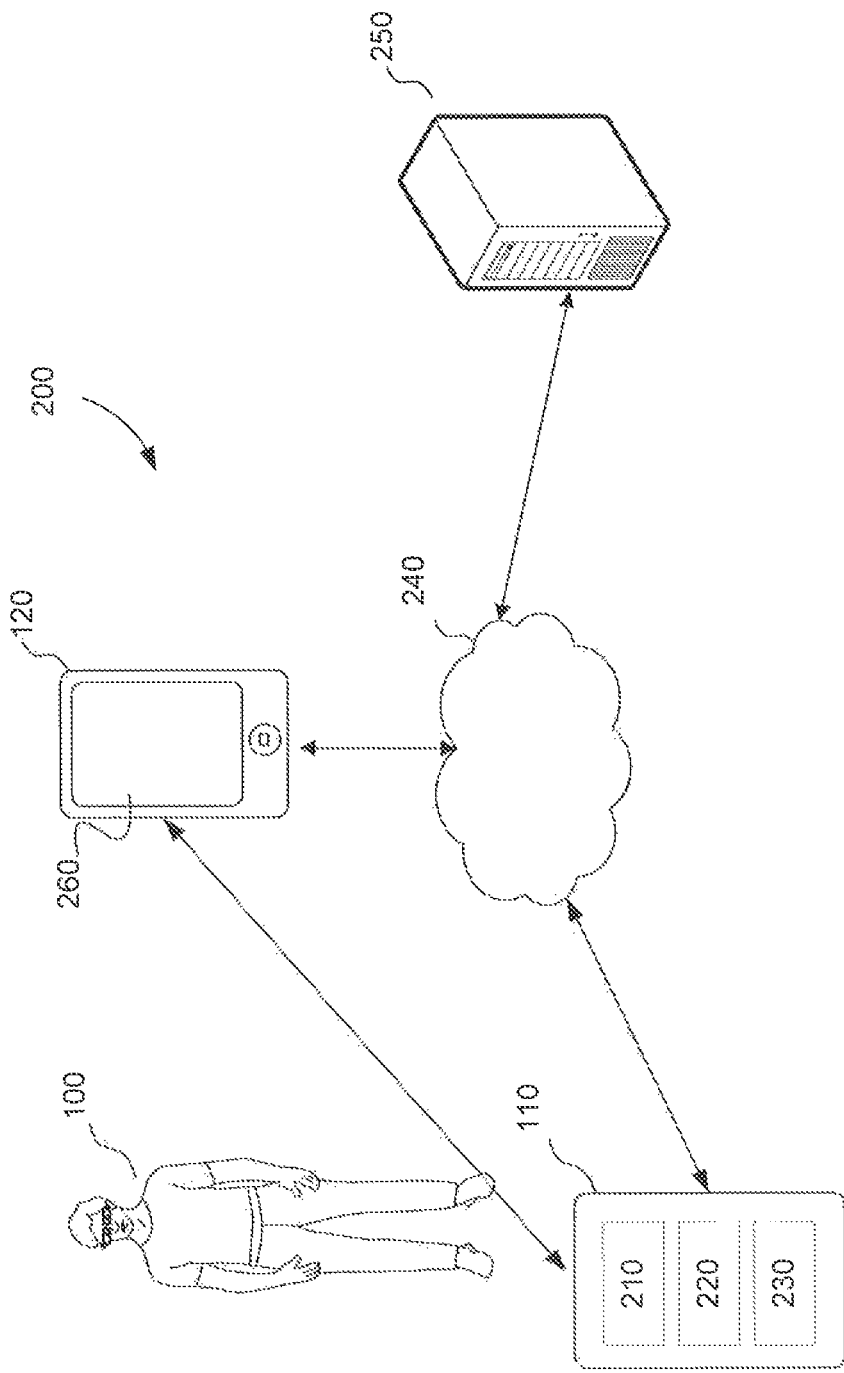
FIG. 2 is a schematic illustration of an example system consistent with the disclosed embodiments.

FIG. 2 is a schematic illustration of an exemplary system 200 including a wearable apparatus 110, worn by user 100, and an optional computing device 120 and/or a server 250 capable of communicating with apparatus 110 via a network 240, consistent with disclosed embodiments. In some embodiments, apparatus 110 may capture and analyze image data, identify a hand-related trigger present in the image data, and perform an action and/or provide feedback to a user 100, based at least in part on the identification of the hand-related trigger. In some embodiments, optional computing device 120 and/or server 250 may provide additional functionality to enhance interactions of user 100 with his or her environment, as described in greater detail below.

According to the disclosed embodiments, apparatus 110 may include an image sensor system 220 for capturing real-time image data of the field-of-view of user 100. In some embodiments, apparatus 110 may also include a processing unit 210 for controlling and performing the disclosed functionality of apparatus 110, such as to control the capture of image data, analyze the image data, and perform an action and/or output a feedback based on a hand-related trigger identified in the image data. According to the disclosed embodiments, a hand-related trigger may include a gesture performed by user 100 involving a portion of a hand of user 100. Further, consistent with some embodiments, a hand-related trigger may include a wrist-related trigger. Additionally, in some embodiments, apparatus 110 may include a feedback outputting unit 230 for producing an output of information to user 100.

As discussed above, apparatus 110 may include an image sensor 220 for capturing image data. The term "image sensor" refers to a device capable of detecting and converting optical signals in the near-infrared, infrared, visible, and ultraviolet spectrums into electrical signals. The electrical signals may be used to form an image or a video stream (i.e. image data) based on the detected signal. The term "image data" includes any form of data retrieved from optical signals in the near-infrared, infrared, visible, and ultraviolet spectrums. Examples of image sensors may include semiconductor charge-coupled devices (CCD), active pixel sensors in complementary metal-oxide-semiconductor (CMOS), or N-type metal-oxide-semiconductor (NMOS, Live MOS). In some cases, image sensor 220 may be part of a camera included in apparatus 110.

Apparatus 110 may also include a processor 210 for controlling image sensor 220 to capture image data and for analyzing the image data according to the disclosed embodiments. As discussed in further detail below with respect to FIG. 5A, processor 210 may include a "processing device" for performing logic operations on one or more inputs of image data and other data according to stored or accessible software instructions providing desired functionality. In some embodiments, processor 210 may also control feedback outputting unit 230 to provide feedback to user 100 including information based on the analyzed image data and the stored software instructions. As the term is used herein, a "processing device" may access memory where executable instructions are stored or, in some embodiments, a "processing device" itself may include executable instructions (e.g., stored in memory included in the processing device).

In some embodiments, the information or feedback information provided to user 100 may include time information. The time information may include any information related to a current time of day and, as described further below, may be presented in any sensory perceptive manner. In some embodiments, time information may include a current time of day in a preconfigured format (e.g., 2:30 pm or 14:30). Time information may include the time in the user's current time zone (e.g., based on a determined location of user 100), as well as an indication of the time zone and/or a time of day in another desired location. In some embodiments, time information may include a number of hours or minutes relative to one or more predetermined times of day. For example, in some embodiments, time information may include an indication that three hours and fifteen minutes remain until a particular hour (e.g., until 6:00 pm), or some other predetermined time. Time information may also include a duration of time passed since the beginning of a particular activity, such as the start of a meeting or the start of a jog, or any other activity. In some embodiments, the activity may be determined based on analyzed image data. In other embodiments, time information may also include additional information related to a current time and one or more other routine, periodic, or scheduled events. For example, time information may include an indication of the number of minutes remaining until the next scheduled event, as may be determined from a calendar function or other information retrieved from computing device 120 or server 250, as discussed in further detail below.

Feedback outputting unit 230 may include one or more feedback systems for providing the output of information to user 100. In the disclosed embodiments, the audible or visual feedback may be provided via any type of connected audible or visual system or both. Feedback of information according to the disclosed embodiments may include audible feedback to user 100 (e.g., using a Bluetooth™ or other wired or wirelessly connected speaker, or a bone conduction headphone). Feedback outputting unit 230 of some embodiments may additionally or alternatively produce a visible output of information to user 100, for example, as part of an augmented reality display projected onto a lens of glasses 130 or provided via a separate heads up display in communication with apparatus 110, such as a display 260 provided as part of computing device 120, which may include an onboard automobile heads up display, an augmented reality device, a virtual reality device, a smartphone, PC, table, etc.

The term "computing device" refers to a device including a processing unit and having computing capabilities. Some examples of computing device 120 include a PC, laptop, tablet, or other computing systems such as an on-board computing system of an automobile, for example, each configured to communicate directly with apparatus 110 or server 250 over network 240. Another example of computing device 120 includes a smartphone having a display 260. In some embodiments, computing device 120 may be a computing system configured particularly for apparatus 110, and may be provided integral to apparatus 110 or tethered thereto. Apparatus 110 can also connect to computing device 120 over network 240 via any known wireless standard (e.g., Wi-Fi, Bluetooth®, etc.), as well as near-field capacitive coupling, and other short range wireless techniques, or via a wired connection. In an embodiment in which computing device 120 is a smartphone, computing device 120 may have a dedicated application installed therein. For example, user 100 may view on display 260 data (e.g., images, video clips, extracted information, feedback information, etc.) that originate from or are triggered by apparatus 110. In addition, user 100 may select part of the data for storage in server 250.

Network 240 may be a shared, public, or private network, may encompass a wide area or local area, and may be implemented through any suitable combination of wired and/or wireless communication networks. Network 240 may further comprise an intranet or the Internet. In some embodiments, network 240 may include short range or near-field wireless communication systems for enabling communication between apparatus 110 and computing device 120 provided in close proximity to each other, such as on or near a user's person, for example. Apparatus 110 may establish a connection to network 240 autonomously, for example, using a wireless module (e.g., Wi-Fi, cellular). In some embodiments, apparatus 110 may use the wireless module when being connected to an external power source, to prolong battery life. Further, communication between apparatus 110 and server 250 may be accomplished through any suitable communication channels, such as, for example, a telephone network, an extranet, an intranet, the Internet, satellite communications, off-line communications, wireless communications, transponder communications, a local area network (LAN), a wide area network (WAN), and a virtual private network (VPN).

As shown in FIG. 2, apparatus 110 may transfer or receive data to/from server 250 via network 240. In the disclosed embodiments, the data being received from server 250 and/or computing device 120 may include numerous different types of information based on the analyzed image data, including information related to a commercial product, or a person's identity, an identified landmark, and any other information capable of being stored in or accessed by server 250. In some embodiments, data may be received and transferred via computing device 120. Server 250 and/or computing device 120 may retrieve information from different data sources (e.g., a user specific database or a user's social network account or other account, the Internet, and other managed or accessible databases) and provide information to apparatus 110 related to the analyzed image data and a recognized trigger according to the disclosed embodiments. In some embodiments, calendar-related information retrieved from the different data sources may be analyzed to provide certain time information or a time-based context for providing certain information based on the analyzed image data.

Figure 3A:
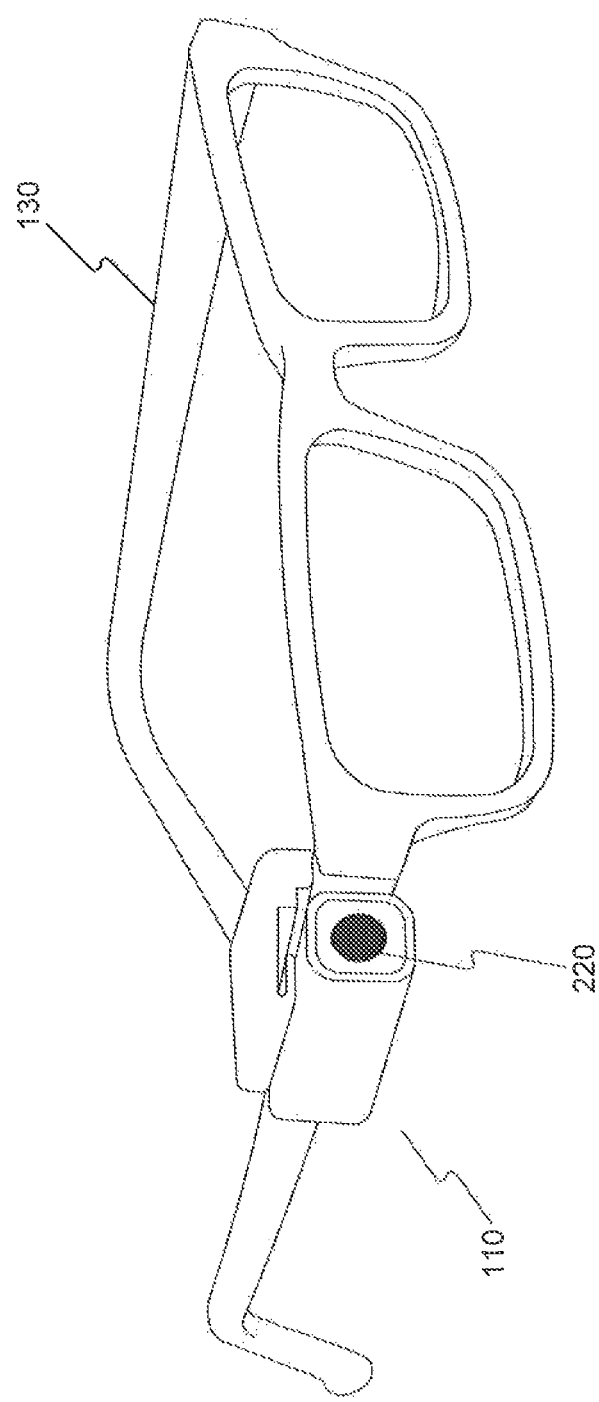
FIG. 3A is a schematic illustration of an example of the wearable apparatus shown in FIG. 1A.

An example wearable apparatus 110 incorporated with glasses 130 according to some embodiments (as discussed in connection with FIG. 1A) is shown in greater detail in FIG. 3A. In some embodiments, apparatus 110 may be associated with a structure (not shown in FIG. 3A) that enables easy detaching and reattaching of apparatus 110 to glasses 130. In some embodiments, when apparatus 110 attaches to glasses 130, image sensor 220 acquires a set aiming direction without the need for directional calibration. The set aiming direction of image sensor 220 may substantially coincide with the field-of-view of user 100. For example, a camera associated with image sensor 220 may be installed within apparatus 110 in a predetermined angle in a position facing slightly downwards (e.g., 5-15 degrees from the horizon). Accordingly, the set aiming direction of image sensor 220 may substantially match the field-of-view of user 100.

FIG. 3B is an exploded view of the components of the embodiment discussed regarding FIG. 3A. Attaching apparatus 110 to glasses 130 may take place in the following way. Initially, a support 310 may be mounted on glasses 130 using a screw 320, in the side of support 310. Then, apparatus 110 may be clipped on support 310 such that it is aligned with the field-of-view of user 100. The term "support" includes any device or structure that enables detaching and reattaching of a device including a camera to a pair of glasses or to another object (e.g., a helmet). Support 310 may be made from plastic (e.g., polycarbonate), metal (e.g., aluminum), or a combination of plastic and metal (e.g., carbon fiber graphite). Support 310 may be mounted on any kind of glasses (e.g., eyeglasses, sunglasses, 3D glasses, safety glasses, etc.) using screws, bolts, snaps, or any fastening means used in the art.

In some embodiments, support 310 may include a quick release mechanism for disengaging and reengaging apparatus 110. For example, support 310 and apparatus 110 may include magnetic elements. As an alternative example, support 310 may include a male latch member and apparatus 110 may include a female receptacle. In other embodiments, support 310 can be an integral part of a pair of glasses, or sold separately and installed by an optometrist. For example, support 310 may be configured for mounting on the arms of glasses 130 near the frame front, but before the hinge. Alternatively, support 310 may be configured for mounting on the bridge of glasses 130.

In some embodiments, apparatus 110 may be provided as part of a glasses frame 130, with or without lenses. Additionally, in some embodiments, apparatus 110 may be configured to provide an augmented reality display projected onto a lens of glasses 130 (if provided), or alternatively, may include a display for projecting time information, for example, according to the disclosed embodiments. Apparatus 110 may include the additional display or alternatively, may be in communication with a separately provided display system that may or may not be attached to glasses 130.

In some embodiments, apparatus 110 may be implemented in a form other than wearable glasses, as described above with respect to FIGS. 1B-1D, for example. FIG. 4A is a schematic illustration of an example of an additional embodiment of apparatus 110 from a first viewpoint. The viewpoint shown in FIG. 4A is from the front of apparatus 110. Apparatus 110 includes an image sensor 220, a clip (not shown), a function button (not shown) and a hanging ring 410 for attaching apparatus 110 to, for example, necklace 140, as shown in FIG. 1B. When apparatus 110 hangs on necklace 140, the aiming direction of image sensor 220 may not fully coincide with the field-of-view of user 100, but the aiming direction would still correlate with the field-of-view of user 100.

FIG. 4B is a schematic illustration of the example of a second embodiment of apparatus 110, from a second viewpoint. The viewpoint shown in FIG. 4B is from a side orientation of apparatus 110. In addition to hanging ring 410, as shown in FIG. 4B, apparatus 110 may further include a clip 420. User 100 can use clip 420 to attach apparatus 110 to a shirt or belt 150, as illustrated in FIG. 1C. Clip 420 may provide an easy mechanism for disengaging and reengaging apparatus 110 from different articles of clothing. In other embodiments, apparatus 10 may include a female receptacle for connecting with a male latch of a car mount or universal stand.

In some embodiments, apparatus 110 includes a function button 430 for enabling user 100 to provide input to apparatus 110. Function button 430 may accept different types of tactile input (e.g., a tap, a click, a double-click, a long press, a right-to-left slide, a left-to-right slide). In some embodiments, each type of input may be associated with a different action. For example, a tap may be associated with the function of taking a picture, while a right-to-left slide may be associated with the function of recording a video.

The example embodiments discussed above with respect to FIGS. 3A, 3B, 4A, and 4B are not limiting. In some embodiments, apparatus 110 may be implemented in any suitable configuration for performing the disclosed methods. For example, referring back to FIG. 2, the disclosed embodiments may implement an apparatus 110 according to any configuration including an image sensor 220 and a processor unit 210 to perform image analysis and for communicating with a feedback unit 230.

Figure 5A:
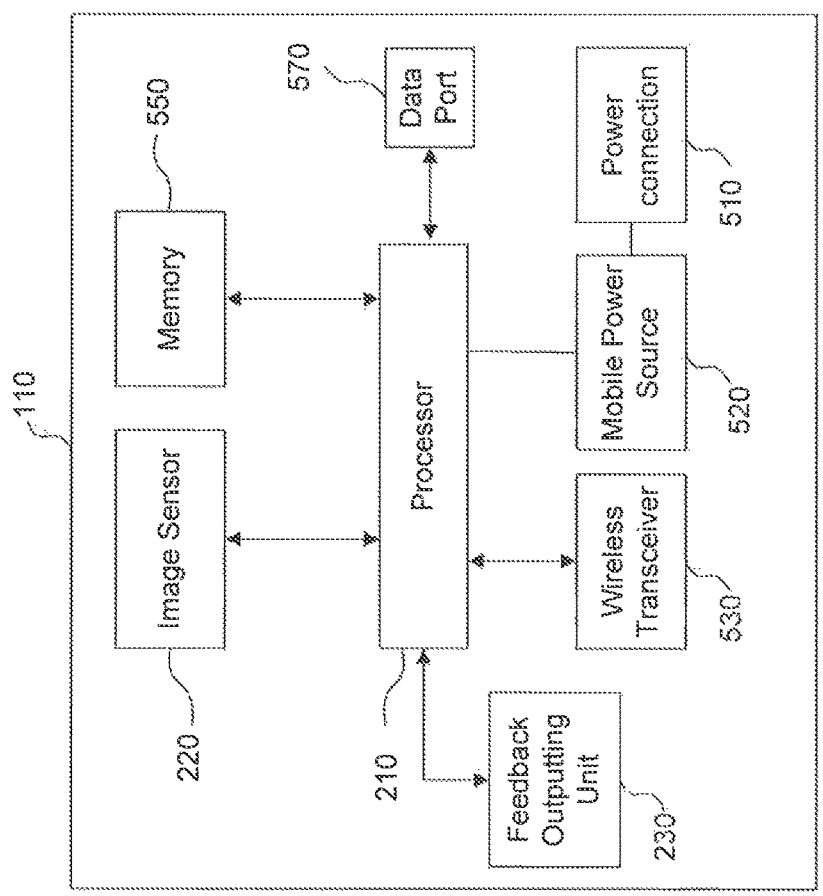
FIG. 5A is a block diagram illustrating an example of the components of a wearable apparatus according to a first embodiment.

FIG. 5A is a block diagram illustrating the components of apparatus 110 according to an example embodiment. As shown in FIG. 5A, and as similarly discussed above, apparatus 110 includes an image sensor 220, a memory 550, a processor 210, a feedback outputting unit 230, a wireless transceiver 530, and a mobile power source 520. In other embodiments, apparatus 110 may also include buttons, other sensors such as a microphone, and inertial measurements devices such as accelerometers, gyroscopes, magnetometers, temperature sensors, color sensors, light sensors, etc. Apparatus 110 may further include a data port 570 and a power connection 510 with suitable interfaces for connecting with an external power source or an external device (not shown).

Processor 210, depicted in FIG. 5A, may include any suitable processing device. The term "processing device" includes any physical device having an electric circuit that performs a logic operation on input or inputs. For example, processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by the processing device may, for example, be pre-loaded into a memory integrated with or embedded into the processing device or may be stored in a separate memory (e.g., memory 550). Memory 550 may comprise a Random Access Memory (RAM), a Read-Only Memory (ROM), a hard disk, an optical disk, a magnetic medium, a flash memory, other permanent, fixed, or volatile memory, or any other mechanism capable of storing instructions.

Although, in the embodiment illustrated in FIG. 5A, apparatus 110 includes one processing device (e.g., processor 210), apparatus 110 may include more than one processing device. Each processing device may have a similar construction, or the processing devices may be of differing constructions that are electrically connected or disconnected from each other. For example, the processing devices may be separate circuits or integrated in a single circuit. When more than one processing device is used, the processing devices may be configured to operate independently or collaboratively. The processing devices may be coupled electrically, magnetically, optically, acoustically, mechanically or by other means that permit them to interact.

In some embodiments, processor 210 may process a plurality of images captured from the environment of user 100 to determine different parameters related to capturing subsequent images. For example, processor 210 can determine, based on information derived from captured image data, a value for at least one of the following: an image resolution, a compression ratio, a cropping parameter, frame rate, a focus point, an exposure time, an aperture size, and a light sensitivity. The determined value may be used in capturing at least one subsequent image. Additionally, processor 210 can detect images including at least one hand-related trigger in the environment of the user and perform an action and/or provide an output of information to a user via feedback outputting unit 230.

In another embodiment, processor 210 can change the aiming direction of image sensor 220. For example, when apparatus 110 is attached with clip 420, the aiming direction of image sensor 220 may not coincide with the field-of-view of user 100. Processor 210 may recognize certain situations from the analyzed image data and adjust the aiming direction of image sensor 220 to capture relevant image data. For example, in one embodiment, processor 210 may detect an interaction with another individual and sense that the individual is not fully in view, because image sensor 220 is tilted down. Responsive thereto, processor 210 may adjust the aiming direction of image sensor 220 to capture image data of the individual. Other scenarios are also contemplated where processor 210 may recognize the need to adjust an aiming direction of image sensor 220.

In some embodiments, processor 210 may communicate data to feedback-outputting unit 230, which may include any device configured to provide information to a user 100. Feedback outputting unit 230 may be provided as part of apparatus 110 (as shown) or may be provided external to apparatus 110 and communicatively coupled thereto. Feedback-outputting unit 230 may be configured to output visual or nonvisual feedback based on signals received from processor 210, such as when processor 210 recognizes a hand-related trigger in the analyzed image data.

The term "feedback" refers to any output or information provided in response to processing at least one image in an environment. In some embodiments, as similarly described above, feedback may include an audible or visible indication of time information, detected text or numerals, the value of currency, a branded product, a person's identity, the identity of a landmark or other environmental situation or condition including the street names at an intersection or the color of a traffic light, etc., as well as other information associated with each of these. For example, in some embodiments, feedback may include additional information regarding the amount of currency still needed to complete a transaction, information regarding the identified person, historical information or times and prices of admission etc. of a detected landmark etc. In some embodiments, feedback may include an audible tone, a tactile response, and/or information previously recorded by user 100. Feedback-outputting unit 230 may comprise appropriate components for outputting acoustical and tactile feedback. For example, feedback-outputting unit 230 may comprise audio headphones, a hearing aid type device, a speaker, a bone conduction headphone, interfaces that provide tactile cues, vibrotactile stimulators, etc. In some embodiments, processor 210 may communicate signals with an external feedback outputting unit 230 via a wireless transceiver 530, a wired connection, or some other communication interface. In some embodiments, feedback outputting unit 230 may also include any suitable display device for visually displaying information to user 100.

As shown in FIG. 5A, apparatus 110 includes memory 550. Memory 550 may include one or more sets of instructions accessible to processor 210 to perform the disclosed methods, including instructions for recognizing a hand-related trigger in the image data. In some embodiments memory 550 may store image data (e.g., images, videos) captured from the environment of user 100. In addition, memory 550 may store information specific to user 100, such as image representations of known individuals, favorite products, personal items, and calendar or appointment information, etc. In some embodiments, processor 210 may determine, for example, which type of image data to store based on available storage space in memory 550. In another embodiment, processor 210 may extract information from the image data stored in memory 550.

As further shown in FIG. 5A, apparatus 110 includes mobile power source 520. The term "mobile power source" includes any device capable of providing electrical power, which can be easily carried by hand (e.g., mobile power source 520 may weigh less than a pound). The mobility of the power source enables user 100 to use apparatus 110 in a variety of situations. In some embodiments, mobile power source 520 may include one or more batteries (e.g., nickel-cadmium batteries, nickel-metal hydride batteries, and lithium-ion batteries) or any other type of electrical power supply. In other embodiments, mobile power source 520 may be rechargeable and contained within a casing that holds apparatus 110. In yet other embodiments, mobile power source 520 may include one or more energy harvesting devices for converting ambient energy into electrical energy (e.g., portable solar power units, human vibration units, etc.).

Mobile power source 510 may power one or more wireless transceivers (e.g., wireless transceiver 530 in FIG. 5A). The term "wireless transceiver" refers to any device configured to exchange transmissions over an air interface by use of radio frequency, infrared frequency, magnetic field, or electric field. Wireless transceiver 530 may use any known standard to transmit and/or receive data (e.g., Wi-Fi, Bluetooth®, Bluetooth Smart, 802.15.4, or ZigBee). In some embodiments, wireless transceiver 530 may transmit data (e.g., raw image data, processed image data, extracted information) from apparatus 110 to computing device 120 and/or server 250. Wireless transceiver 530 may also receive data from computing device 120 and/or server 250. In other embodiments, wireless transceiver 530 may transmit data and instructions to an external feedback outputting unit 230.

Figure 5B:
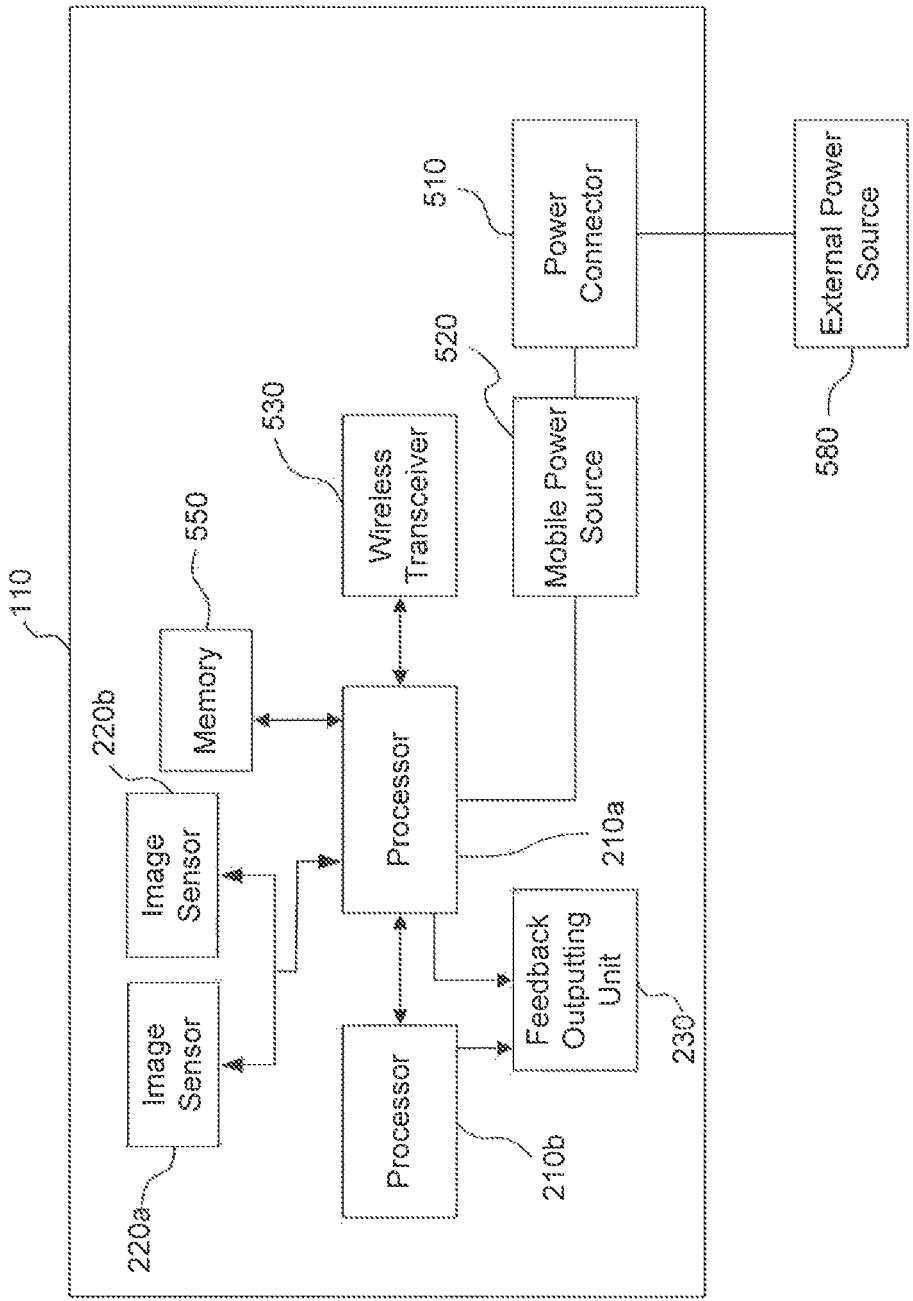
FIG. 5B is a block diagram illustrating an example of the components of a wearable apparatus according to a second embodiment.

FIG. 5B is a block diagram illustrating the components of apparatus 110 according to another example embodiment. In some embodiments, apparatus 110 includes a first image sensor 220a, a second image sensor 220b, a memory 550, a first processor 210a, a second processor 210b, a feedback outputting unit 230, a wireless transceiver 530, a mobile power source 520, and a power connector 510. In the arrangement shown in FIG. 5B, each of the image sensors may provide images in a different image resolution, or face a different direction. Alternatively, each image sensor may be associated with a different camera (e.g., a wide angle camera, a narrow angle camera, an IR camera, etc.). In some embodiments, apparatus 110 can select which image sensor to use based on various factors. For example, processor 210a may determine, based on available storage space in memory 550, to capture subsequent images in a certain resolution.

Apparatus 110 may operate in a first processing-mode and in a second processing-mode, such that the first processing-mode may consume less power than the second processing-mode. For example, in the first processing-mode, apparatus 110 may capture images and process the captured images to make real-time decisions based on an identified hand-related trigger, for example. In the second processing-mode, apparatus 110 may extract information from stored images in memory 550 and delete images from memory 550. In some embodiments, mobile power source 520 may provide more than fifteen hours of processing in the first processing-mode and about three hours of processing in the second processing-mode. Accordingly, different processing-modes may allow mobile power source 520 to produce sufficient power for powering apparatus 110 for various time periods (e.g., more than two hours, more than four hours, more than ten hours, etc.).

In some embodiments, apparatus 110 may use first processor 210a in the first processing-mode when powered by mobile power source 520, and second processor 210b in the second processing-mode when powered by external power source 580 that is connectable via power connector 510. In other embodiments, apparatus 110 may determine, based on predefined conditions, which processors or which processing modes to use. Apparatus 110 may operate in the second processing-mode even when apparatus 110 is not powered by external power source 580. For example, apparatus 110 may determine that it should operate in the second processing-mode when apparatus 110 is not powered by external power source 580, if the available storage space in memory 550 for storing new image data is lower than a predefined threshold.

Although one wireless transceiver is depicted in FIG. 513B, apparatus 110 may include more than one wireless transceiver (e.g., two wireless transceivers). In an arrangement with more than one wireless transceiver, each of the wireless transceivers may use a different standard to transmit and/or receive data. In some embodiments, a first wireless transceiver may communicate with server 250 or computing device 120 using a cellular standard (e.g., LTE or GSM), and a second wireless transceiver may communicate with server 250 or computing device 120 using a short-range standard (e.g., Wi-Fi or Bluetooth®). In some embodiments, apparatus 110 may use the first wireless transceiver when the wearable apparatus is powered by a mobile power source included in the wearable apparatus, and use the second wireless transceiver when the wearable apparatus is powered by an external power source.

Figure 5C:
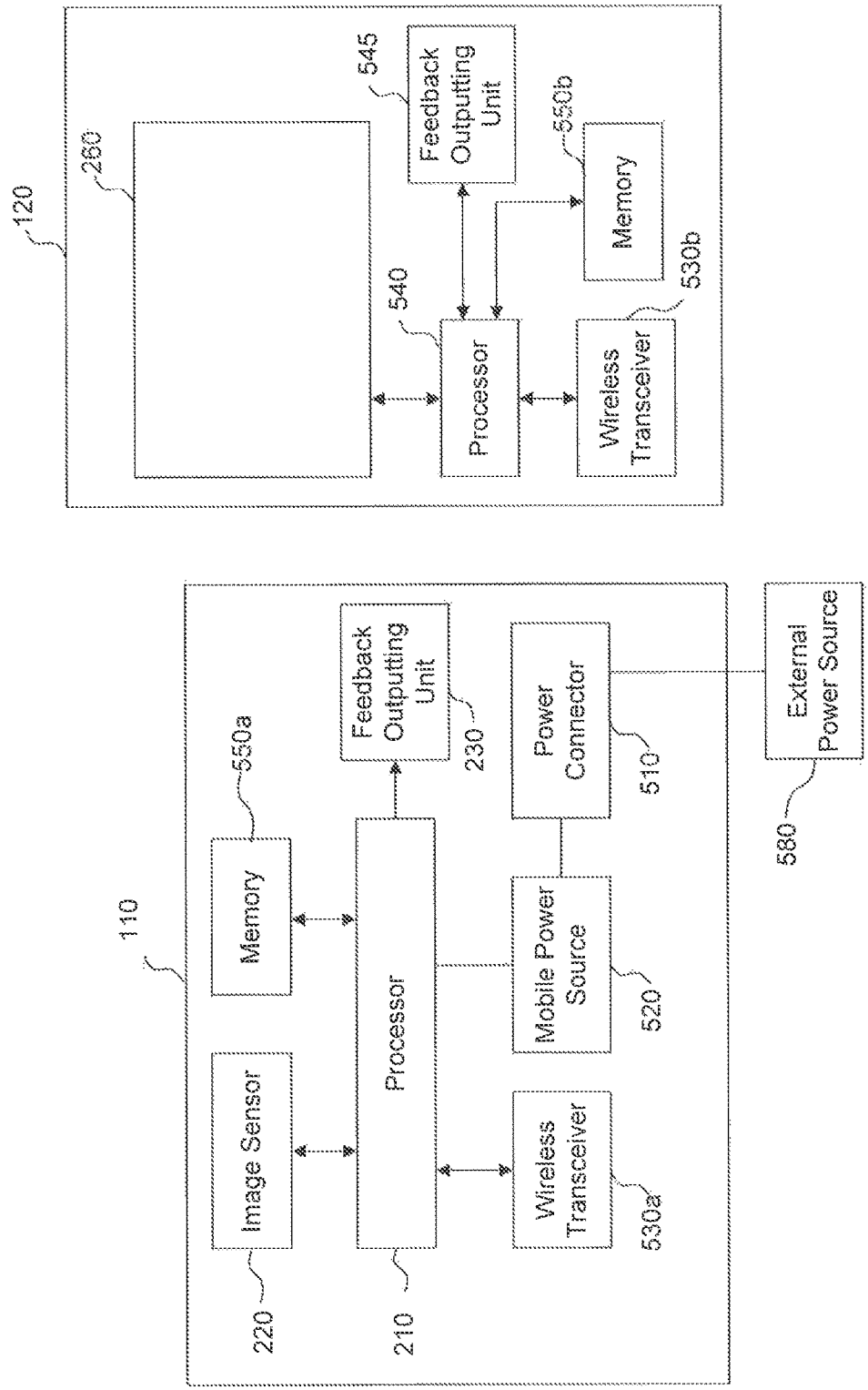
FIG. 5C is a block diagram illustrating an example of the components of a wearable apparatus according to a third embodiment.

FIG. 5C is a block diagram illustrating the components of apparatus 110 according to another example embodiment including computing device 120. In this embodiment, apparatus 110 includes an image sensor 220, a memory 550a, a first processor 210, a feedback-outputting unit 230, a wireless transceiver 530a, a mobile power source 520, and a power connector 510. As further shown in FIG. 5C, computing device 120 includes a processor 540, a feedback-outputting unit 545, a memory 550b, a wireless transceiver 530b, and a display 260. One example of computing device 120 is a smartphone or tablet having a dedicated application installed therein. In other embodiments, computing device 120 may include any configuration such as an on-board automobile computing system, a PC, a laptop, and any other system consistent with the disclosed embodiments. In this example, user 100 may view feedback output in response to identification of a hand-related trigger on display 260. Additionally, user 100 may view other data (e.g., images, video clips, object information, schedule information, extracted information, etc.) on display 260. In addition, user 100 may communicate with server 250 via computing device 120.

In some embodiments, processor 210 and processor 540 are configured to extract information from captured image data. The term "extracting information" includes any process by which information associated with objects, individuals, locations, events, etc., is identified in the captured image data by any means known to those of ordinary skill in the art. In some embodiments, apparatus 110 may use the extracted information to send feedback or other real-time indications to feedback outputting unit 230 or to computing device 120. In some embodiments, processor 210 may identify in the image data the individual standing in front of user 100, and send computing device 120 the name of the individual and the last time user 100 met the individual. In another embodiment, processor 210 may identify in the image data, one or more visible triggers, including a hand-related trigger, and determine whether the trigger is associated with a person other than the user of the wearable apparatus to selectively determine whether to perform an action associated with the trigger. One such action may be to provide a feedback to user 100 via feedback-outputting unit 230 provided as part of (or in communication with) apparatus 110 or via a feedback unit 545 provided as part of computing device 120. For example, feedback-outputting unit 545 may be in communication with display 260 to cause the display 260 to visibly output information. In some embodiments, processor 210 may identify in the image data a hand-related trigger and send computing device 120 an indication of the trigger. Processor 540 may then process the received trigger information and provide an output via feedback outputting unit 545 or display 260 based on the hand-related trigger. In other embodiments, processor 540 may determine a hand-related trigger and provide suitable feedback similar to the above, based on image data received from apparatus 110. In some embodiments, processor 540 may provide instructions or other information, such as environmental information to apparatus 110 based on an identified hand-related trigger.

In some embodiments, processor 210 may identify other environmental information in the analyzed images, such as an individual standing in front user 100, and send computing device 120 information related to the analyzed information such as the name of the individual and the last time user 100 met the individual. In a different embodiment, processor 540 may extract statistical information from captured image data and forward the statistical information to server 250. For example, certain information regarding the types of items a user purchases, or the frequency a user patronizes a particular merchant, etc. may be determined by processor 540. Based on this information, server 250 may send computing device 120 coupons and discounts associated with the user's preferences.

When apparatus 110 is connected or wirelessly connected to computing device 120, apparatus 110 may transmit at least part of the image data stored in memory 550a for storage in memory 550b. In some embodiments, after computing device 120 confirms that transferring the part of image data was successful, processor 540 may delete the part of the image data. The term "delete" means that the image is marked as 'deleted' and other image data may be stored instead of it, but does not necessarily mean that the image data was physically removed from the memory.

As will be appreciated by a person skilled in the art having the benefit of this disclosure, numerous variations and/or modifications may be made to the disclosed embodiments. Not all components are essential for the operation of apparatus 110. Any component may be located in any appropriate apparatus and the components may be rearranged into a variety of configurations while providing the functionality of the disclosed embodiments. Therefore, the foregoing configurations are examples and, regardless of the configurations discussed above, apparatus 110 can capture, store, and process images.

Further, the foregoing and following description refers to storing and/or processing images or image data. In the embodiments disclosed herein, the stored and/or processed images or image data may comprise a representation of one or more images captured by image sensor 220. As the term is used herein, a "representation" of an image (or image data) may include an entire image or a portion of an image. A representation of an image (or image data) may have the same resolution or a lower resolution as the image (or image data), and/or a representation of an image (or image data) may be altered in some respect (e.g., be compressed, have a lower resolution, have one or more colors that are altered, etc.).

For example, apparatus 110 may capture an image and store a representation of the image that is compressed as a .JPG file. As another example, apparatus 110 may capture an image in color, but store a black-and-white representation of the color image. As yet another example, apparatus 110 may capture an image and store a different representation of the image (e.g., a portion of the image). For example, apparatus 110 may store a portion of an image that includes a face of a person who appears in the image, but that does not substantially include the environment surrounding the person. Similarly, apparatus 110 may, for example, store a portion of an image that includes a product that appears in the image, but does not substantially include the environment surrounding the product. As yet another example, apparatus 110 may store a representation of an image at a reduced resolution (i.e., at a resolution that is of a lower value than that of the captured image). Storing representations of images may allow apparatus 110 to save storage space in memory 550. Furthermore, processing representations of images may allow apparatus 110 to improve processing efficiency and/or help to preserve battery life.

In addition to the above, in some embodiments, any one of apparatus 110 or computing device 120, via processor 210 or 540, may further process the captured image data to provide additional functionality to recognize objects and/or gestures and/or other information in the captured image data. In some embodiments, actions may be taken based on the identified objects, gestures, or other information. In some embodiments, processor 210 or 540 may identify in the image data, one or more visible triggers, including a hand-related trigger, and determine whether the trigger is associated with a person other than the user to determine whether to perform an action associated with the trigger.

Wearable apparatus 110 may be configured to capture image data of an environment of user 100 using at least one image sensor, which may be a wide viewing angle image sensor. The field of view of the wide viewing angle image sensor may include at least a portion of a chin of user 100. The field of view of the image sensor may be more than 100°, for example, more than 180°, or more than 300°. The image sensor may be included in a capturing unit. The image sensor may be associated with a corresponding lens located on the capturing unit.

Wearable apparatus 110 may include a directional microphone configured to detect or receive a sound or sound wave. Wearable apparatus 110 may further include at least one processing device programmed to analyze the detected sound wave and identify a direction of the sound wave received by the microphone. The processing device may also be programmed to identify a portion of at least one image captured by the at least one image sensor based on the direction of the sound wave received by the microphone. The processing device may also be programmed to store the identified portion of the at least one image in, for example, a storage device or image database. The processing device may be further programmed to identify the chin of user 100 in at least one image captured by the at least one image sensor. For example, when the processing device determines a movement of the chin of user 100 from at least two sequentially captured images, the processing device may determine that the user is speaking, and may activate the microphone.

Wearable apparatus 110 may include one or more energy devices configured to provide power to wearable apparatus 110 and save energy cost associated with operating wearable apparatus 110. For example, wearable apparatus 110 may include at least one solar cell configured to convert the solar energy into electrical energy, which may be used to power some components of wearable apparatus 110, such as the image sensor. Using solar cells to provide at least a portion of the energy needed to operate wearable apparatus 110 may help reduce the cost associated with operating wearable apparatus 110, and prolong the standby and operation time of wearable apparatus 110. In some embodiments, a plurality of solar cells may be included in the capturing unit proximate the lens. Wearable apparatus 110 may include a power unit that includes a battery for storing at least some energy generated by at least one solar cell.

In some embodiments, wearable apparatus 110 may be associated with a body power harvesting device, such as one converting the body motion or mechanical energy into electrical energy. Wearable apparatus 110 may further include an energy storage device configured to store energy derived from movements of user 100. The converted electrical energy may be used to power certain components of wearable apparatus 110, such as the image sensor. This may reduce the energy cost associated with operating wearable apparatus 110 and prolong the standby and operation time of wearable apparatus 110.

Figure 6:
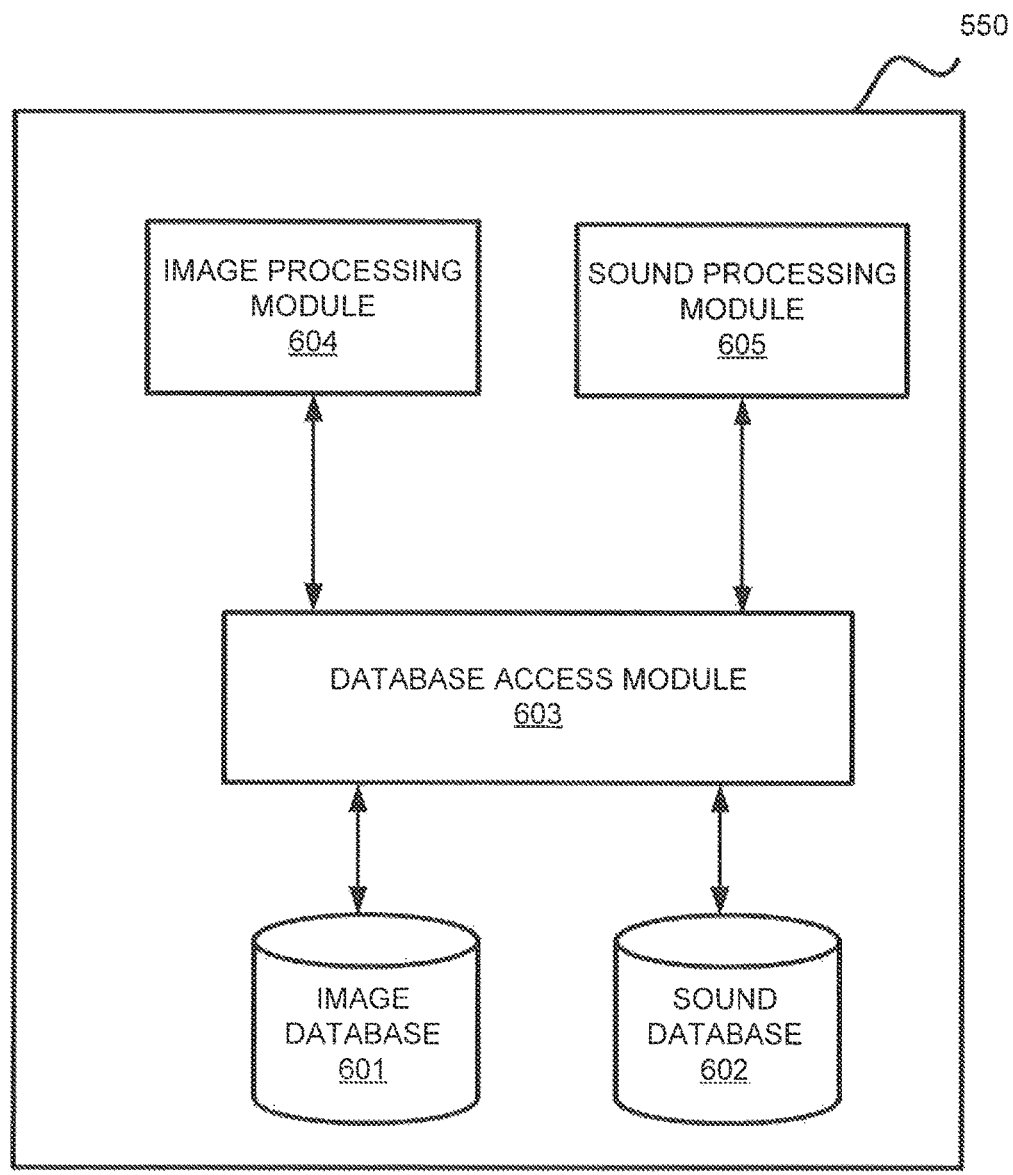
FIG. 6 is a diagram illustrating an example memory storing a plurality of modules according to a disclosed embodiment.

FIG. 6 is a block diagram illustrating a memory (e.g., memory 550, 550a, and/or 550b) according to the disclosed embodiments. The memory may include one or more modules, or sets of instructions, for performing methods consistent with the disclosed embodiments. For example, the memory may include instructions for at least one processing device to analyze image captured by the image sensor and/or sound detected by the microphone. In some embodiments, the processing device may be included in wearable apparatus 110. For example, the processing device may be processor 210, 210a, and/or 210b shown in FIGS. 5A and 5B. The processing device may process the image data captured by the image sensor in near real time, as the image data are being captured by the image sensor. In some embodiments, the processing device may be a processor that is separately located from wearable apparatus 110. The processing device may be a processor that is remotely connected with wearable apparatus 110 through network 240, which may be a wired or wireless network, or through any other connectivity means, such as infrared, Bluetooth, near field communication (NFC), etc. For example, the processing device may be processor 540 included in computing device 120, which may be connected with wearable apparatus 110 through a wired or wireless connection, such as through a cable, Bluetooth, WiFi, infrared, or near field communication (NFC). In some embodiments, the processing device may be a processor included in server 250, which may be wirelessly connected with wearable apparatus 110 through network 240. In some embodiments, the processing device may be a cloud computing processor remotely and wirelessly connected with wearable apparatus 110 through network 240. Wearable apparatus 110 may transmit captured image data to the processing device in near real time, and the processing device may process the captured image data and provide results of processing to wearable apparatus 110 in near real time.

In the embodiment shown in FIG. 6, memory 550 comprises an image database 601, a sound database 602, a database access module 603, an image processing module 604, and a sound processing module 605, for performing the functionality of the disclosed methods. Additional or fewer databases and/or modules may be included in memory 550. The modules and databases shown in FIG. 6 are by example only, and a processor in the disclosed embodiments may operate according to any suitable process.

In the embodiment shown in FIG. 6, memory 550 is configured to store an image database 601. Image database 601 may be configured to store various images, such as images captured by an image sensor (e.g., image sensor 220, 220a, and/or 220b). Image database 601 may also be configured to store data other than image data, such as textual data, audio data, video data, etc. Alternatively or additionally, memory 550 may include a sound database 602 configured to store audio data, such as sound detected by the microphone.

As shown in FIG. 6, memory 550 is also configured to store a database access module 603. Database access module 603 may be configured to access image database 601 and sound database 602, for example, to retrieve previously stored image data captured by the image sensor for analysis. In some embodiments, database access module 603 may be configured to retrieve previously stored sound data that may be received by a microphone. Database access module 603 may also be configured to store image data into image database 601 and store sound data into sound database 602.

In the embodiment shown in FIG. 6, memory 550 is configured to store an image processing module 604. Image processing module 604 may be configured to perform various analyses and processes of image data captured by the image sensor to identify an object. Memory 550 is configured to store a sound processing module 605. Sound processing module 605 may be configured to perform various analyses and processes of sound data, such as sound data recorded by a microphone. Sound processing module 605 may determine a direction associated with a sound, for example, where the sound is coming from. The direction information determined from the sound data may be used by sound processing module 605 and/or image processing module 604 to identify a portion of at least one image captured by the at least one image sensor. Database access module 603 may store the identified portion of the at least one image into image database 601.

Figure 7:
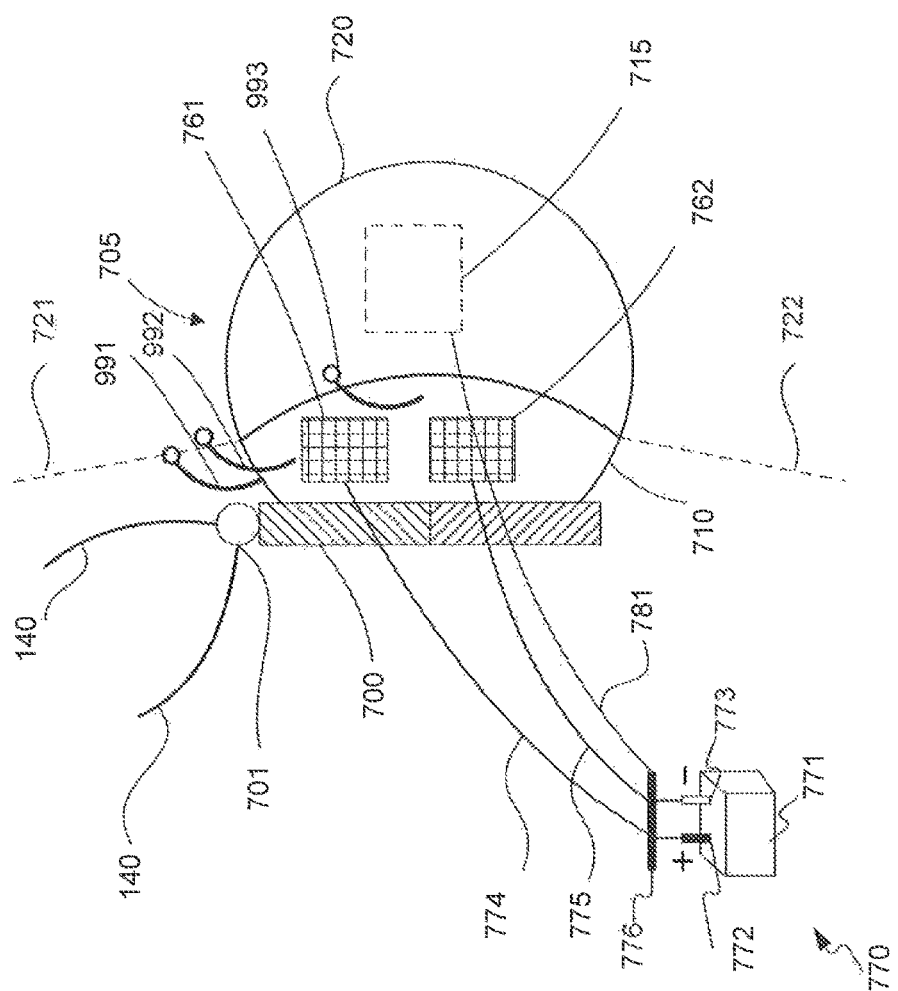
FIG. 7 is a schematic illustration of a side view of an example wearable apparatus having a wide viewing angle image sensor for capturing image data according to a disclosed embodiment.

FIG. 7 is a schematic illustration of a side view of an example wearable apparatus 110 having an image sensor for capturing image data of an environment of user 100, consistent with the disclosed embodiments. Wearable apparatus 110 may be worn by user 100 in various ways through an attachment mechanism. The attachment mechanism may include any suitable means. For example, as shown in FIG. 1B, wearable apparatus 110 may be carried on necklace 140 worn by user 100. As shown in FIG. 3A, wearable apparatus 110 may be attached to eye glasses 130 through support 310 and screw 320. As shown in FIG. 4A, wearable apparatus 110 may include a hanging ring 410 for attaching to, for example, necklace 140. As shown in FIG. 4B, wearable apparatus 110 may include a clip 420 for attaching to the belt or cloth of user 100. FIG. 7 shows that wearable apparatus 110 includes a base 700 to which necklace 140 may be attached through a fastening device 701, which may be similar to ring 410 disclosed in FIG. 4A. In some embodiments, wearable apparatus 110 may be worn on user's head (e.g., clipped to a cap, hat, or helmet worn by user 100) or user's arm (e.g., secured via an arm band).

Wearable apparatus 110 may include an image capturing unit 705 (or a capturing unit 705) mounted on base 700. Any suitable mounting means, such as glue, screws, bolts and nuts, clamping, etc., may be used for mounting capturing unit 705 onto base 700. Image capturing unit 705 may include a housing 710 having a semi-sphere, half sphere, or sphere shape. Housing 710 may include other three-dimensional shapes, such as cubic shape, cylindrical shape, etc.

Wearable apparatus 110 may include an image sensor 715. Image sensor 715 may be a wide viewing angle image sensor 715 (also referred as wide angle image sensor 715), which may be associated with a field of view indicated by the dashed lines 721 and 722. The angle formed by the dashed lines 721 and 722, e.g., from dashed line 721 to dashed line 722 in a clockwise direction, indicates the angle of the field of view. The angle may be more than 100°, such as more than 180°, or more than 300°. In some embodiments, wearable apparatus 110 may include a plurality of image sensors, and at least one of the plurality of image sensors a wide angle image sensor. Suitable number of image sensors may be included, such as two, three, four, etc. In some embodiments, wide angle image sensor 715 may include a plurality of wide angle image sensors distributed in the capturing unit 705. Image sensor 715 may be similar to image sensors 220, 220a, and 220b discussed above and depicted in, e.g., FIGS. 2, 5A, and 5B. Image sensor 715 may be enclosed within housing 710 of capturing unit 705. Image sensor 715 may be associated with a corresponding lens 720. Lens 720 may be a single lens, or may include a plurality of small lenses. Lens 720 may be at least partially disposed on housing 710, or may form a part of housing 710 to enclose image sensor 715.

Wearable apparatus 110 may include at least one solar cell configured to provide power to some components of wearable apparatus 110, such as image sensor 715. As shown in FIG. 7, wearable apparatus 110 may include two solar cells 761 and 762. Solar cells 761 and 762 may be configured to convert solar energy into electrical energy, and provide the electrical energy to power one or more components of wearable apparatus 110, such as image sensor 715. Additional or fewer solar cells may be included.

Solar cells 761 and 762 may be included in capturing unit 705 that includes image sensor 715. As shown in FIG. 7, solar cells 761 and 762 may be disposed on an outer surface of housing 710 proximate to lens 720. Although not shown, solar cells 761 and 762 may be disposed at other locations on the outer surface of housing 710. For example, one solar cell 761 may be disposed on the opposite side of housing 710 with respect to solar cell 762. In some embodiments, additional solar cells may be on the opposite side of housing 710. In some embodiments, a single solar cell may cover a substantial portion of the outer surface of housing 710.

Wearable apparatus 110 may include a power unit 770 electrically connected with solar cells 761 and 762. In some embodiments, power unit 770 may be incorporated within base 700 or housing 710. In some embodiments, as shown in FIG. 7, power unit 770 may be provided separately from base 700 or housing 710 and be electrically connected with other components of wearable apparatus 110. For example, power unit 770 may be clipped to the belt of user 100. Power unit 770 may include a battery 771 configured for storing at least some energy generated by solar cells 761 and 762. Solar cells 761 and 762 may be electrically connected with a positive terminal 772 and a negative terminal 773 of battery 771 through connection lines 774, 775, and a power control line 776.

Solar cells 761 and 762 included in wearable apparatus 110 may provide at least some energy to power some components of wearable apparatus 110, such as image sensor 715. Power unit 770 may be electrically connected with image sensor 715 through a wire 781 and power control line 776 to supply power to image sensor 715. Using solar cells to supply at least a portion of the energy needed to power components of wearable apparatus 110 may reduce the cost associated with operating wearable apparatus 110, and may prolong the standby and operation time of wearable apparatus 110. Power unit 770 may include a separate battery configured to provide additional energy for the operation of wearable apparatus 110.

Wearable apparatus 110 may include two or more microphones configured to detect or receive sound (e.g., a sound wave). In the example shown in FIG. 33, wearable apparatus 110 includes three microphones 991, 992, and 993. Additional or fewer microphones may be included. Microphones 991-993 may be attached to base 700 and/or housing 710, or may be embedded within base 3300 and/or housing 3310. Microphones 991-993 may detect a sound (e.g., a voice), and provide the detected sound to sound database 602 for storage. The processing device (e.g., processor 210, 210a, 210b, or 540) may read or retrieve the sound data from the sound database 602 and analyze the sound data to identify a direction of the sound received by microphones 991-993. Based on the direction of the detected sound, the processing device may identify a portion of at least one image captured by image sensor 715, and process and/or store the identified portion of the at least one image in image database 601.

Figure 8:
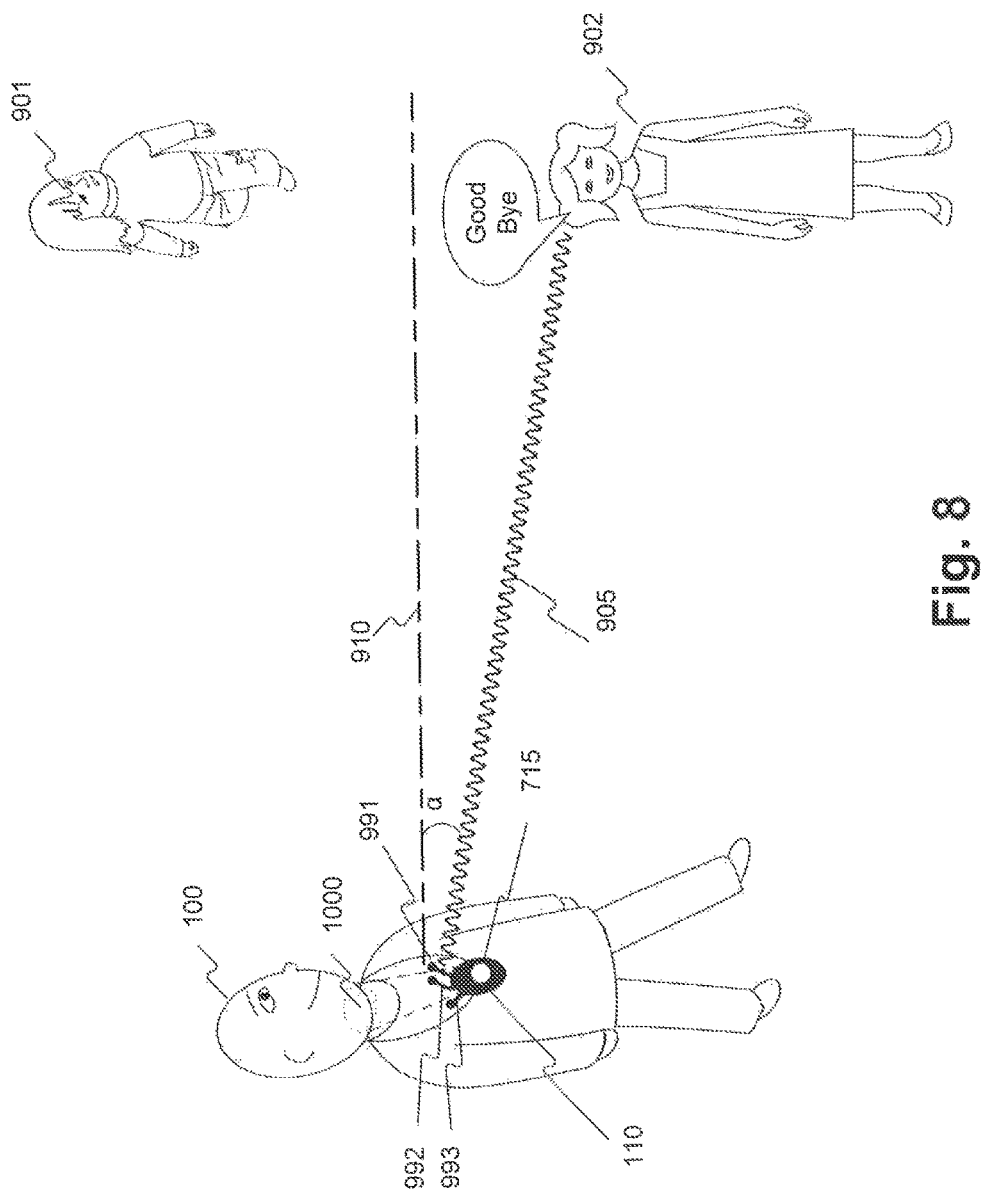
FIG. 8 shows an example environment including a wearable apparatus for capturing image data according to a disclosed embodiment.

FIG. 8 shows an example environment including a wearable apparatus for capturing image data according to a disclosed embodiment. As shown in FIG. 8, first person 901 and second person 902 are facing user 100. Image sensor 715, visibly shown on wearable apparatus 110 for illustrative purposes, may capture an image of the environment of user 100, including persons 901 and 902. Image sensor 715 may also capture image data of user 100, such as, for example, a portion of a chin 1000. The processing device may analyze the image data to identify chin 1000 of user 100. In some embodiments, the processing device may analyze a plurality of sequentially acquired image data to detect that chin 1000 is moving. The processing device may further determine, based on a moving chin, that user 100 is speaking with someone, eating, or turning his or her head.

The movement and/or location of chin 1000 in the captured image may be used as a trigger for the processing device to take actions in controlling and/or selecting microphones 991-993 and processing captured image data. For example, when the processing device determines that user 100 is eating based on the movement of chin 1000, the processing device may turn off one or more microphones 991-993 or may deactivate one or more microphones 991-993 so that one or more microphones are in an idle state. When the processing device determines that chin 1000 is turning (which may indicate that the head of user 100 is turning), the processing device may further determine an estimated direction chin 1000 (and head of user 100) is turning to or facing. The processing device may determine, based on the estimated direction chin 1000 or the head is facing, an area of an image to analyze. For example, when the processing device determines that chin 1000 is facing forward in the direction the chest of user 100 is facing, the processing device may determine that an area in the middle of the captured image should be analyzed. As another example, when the processing device determines that chin 1000 (and head of user 100) appears to face to the left of user 100, the processing device may estimate a direction chin 1000 or the head is facing. The processing device may select an area in the captured image in the estimated direction to the left of user 100, and may analyze the selected area. In some embodiments, the processing device may discard one or more portions of the image outside of the selected area. Analyzing a selected area of interest rather than the entire image captured by wide viewing angle image sensor 715 may reduce the processing time, such as when near real time processing of image data is performed.

In some embodiments, the detection of moving chin 1000 may indicate that user 100 is speaking with someone, and the processing device may selectively activate one or more microphones 991-993, which may be in an idle state. In the idle state, microphones 991-993 may either be turned off (e.g., powered off), or turned on but not recording sound (e.g., receiving sound but not transmitting sound to sound database 602 for storage).

Figure 9:
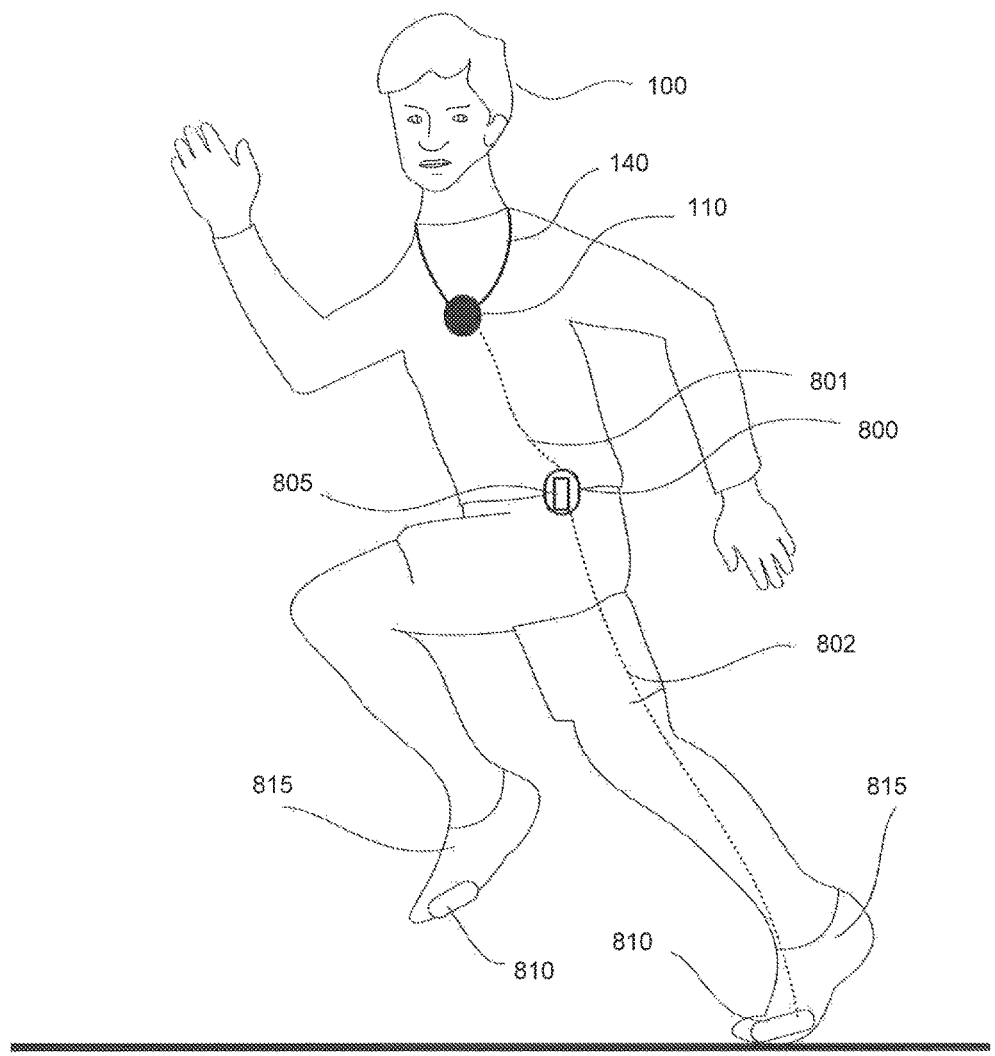
FIG. 9 is a schematic illustration of an example of a user wearing a wearable apparatus according to a disclosed embodiment.

One or more microphones 991-993 may detect a sound wave 905 (or voice 905), "Good Bye," uttered by second person 902. The processing device may analyze the voice or sound wave 905 received by one or more microphones 991-993 to identify a direction of sound wave 905, as indicated in FIG. 9 by an angle ca with respect to a horizontal line 910. In some embodiments, processing device may not identify the exact value of angle α, but rather, may estimate a rough value of angle α. Based on the identified direction, the processing device may identify a portion of at least one image captured by image sensor 715. For example, after identifying the direction of sound wave 905, the processing device may adjust a resolution of the wide angle image sensor 715 and capture image data of second person 902 in a high resolution. For example, image sensor 715 may capture image data of the face, hair style, and/or dress of second person 902 in a high resolution. The processing device may analyze the captured image data and provide detailed information regarding second person 902 to user 100. For example, wearable apparatus 110 may provide the detailed information regarding second person 902 to user 100 in text, audio, and/or video messages through feedback outputting unit 230 and/or computing device 120.

In some embodiments, image sensor 715 may be initially turned on, and may be capturing image data of the environment of user 100, but may not be transmitting the captured image data to image database 601 for storage and for further analysis by the processing device. After identifying the direction of sound wave 905 received by one or more microphones 991-993, the processing device may adjust a resolution of image sensor 715 such that it captures image data of second person 902 with a high resolution and transmit the captured data to image database 601 for storage and further analysis. Image sensor 715 may capture image data of second person 902 and transmit the image data to image database 601 for storage and for further analysis by the processing device.

FIG. 9 is a schematic illustration of an example of user 100 wearing wearable apparatus 110 according to a disclosed embodiment. In this embodiment, wearable apparatus 110 may include a power unit 800 including an energy storage device 805 (e.g., a battery, a capacitor, etc.) configured to store energy derived from movements of user 100. In some embodiments, power unit 800 may be incorporated within housing 710 or base 700. In some embodiments, as shown in FIG. 8, power unit 800 may be provided separately from housing 710 or base 700, and be electrically connected with other components, such as image sensor 715 of wearable apparatus through one or more wires 801.

User 100 may carry a body power harvesting device 810 configured to convert body motion power into electrical energy. Body power harvesting device 810 may be electrically connected with power unit 800 through one or more wires 802. Wires 801 and 802 may be at least partially incorporated with the clothes user 100 is wearing. When user 100 is walking, running, or jumping, the feet of user 100 may impact the ground with shoes 815 and the impact may generate energy. In some embodiments, body power harvesting device 810 and wearable apparatus 110 may be included together in a housing (e.g., included inside a shared physical casing).

An example body power harvesting device 810 may include a piezoelectric device incorporated within or at the bottoms of shoes 815 worn by user 100. The piezoelectric device may be configured to convert mechanical energy generated by the impact between the ground and shoes 815 when user 100 is walking, running, or jumping, into electrical energy. The piezoelectric device includes piezoelectric materials that convert mechanical energy into electrical energy when the materials are bent and/or compressed.

Body power harvesting device 810 may supply converted electrical energy to energy storage device 805 for storage. The stored electrical energy may be used to power certain components of wearable apparatus 110, such as image sensor 715. Harvesting a portion of the body motion power into electric power and use that for powering certain components of wearable apparatus 110 may reduce the energy cost associated with operating wearable apparatus 110 and may prolong the standby and operation time of wearable apparatus 110. In some embodiments, other body power harvesting devices, such as one that converts body heat energy into electrical energy may also be included in or otherwise associated with wearable apparatus 110. Further, in some embodiments, two or more of wearable apparatus 110, body power harvesting device 810, and energy store device 805 may be included together in a housing (e.g., included inside a shared physical casing).

Figure 10:
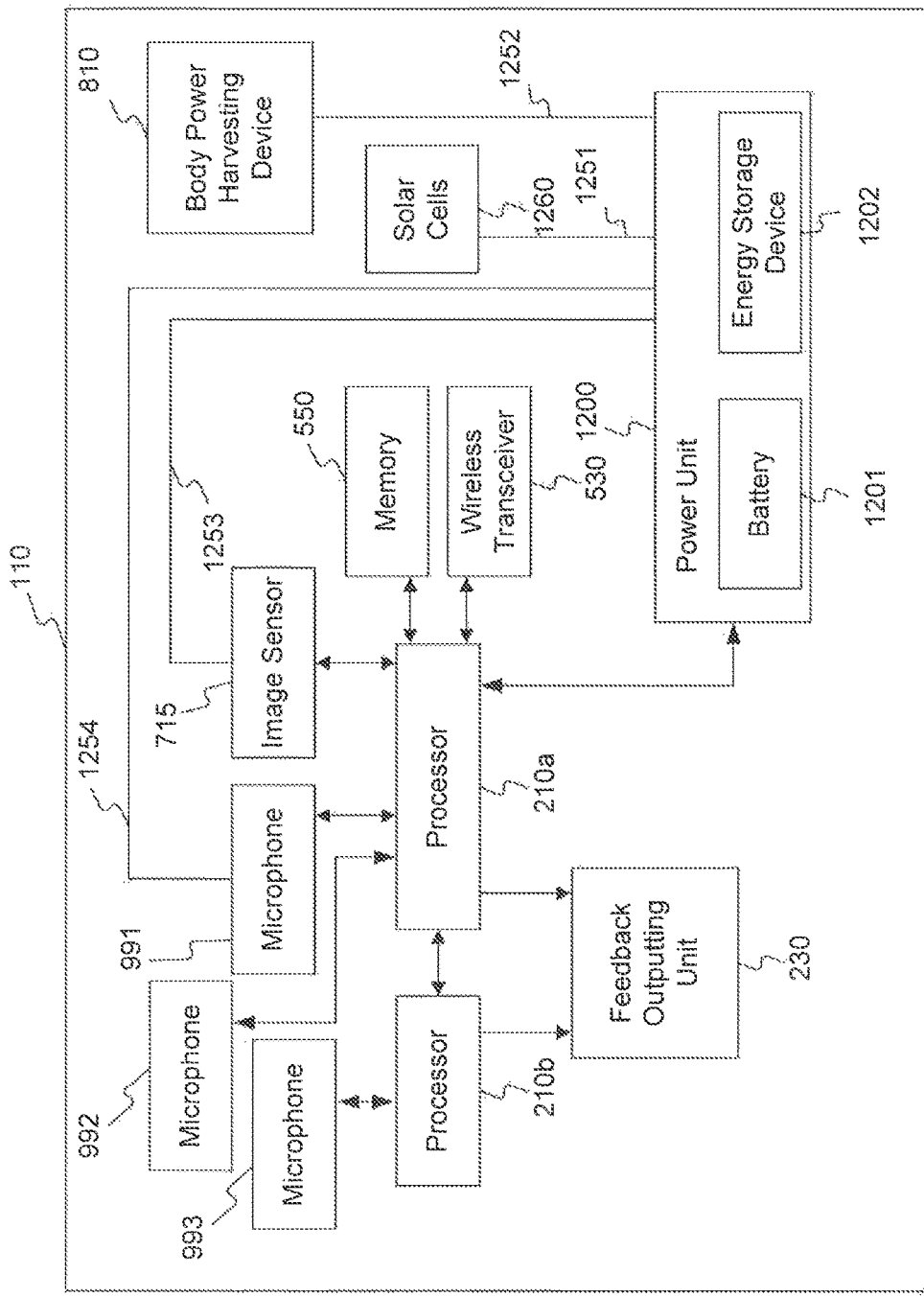
FIG. 10 is a block diagram illustrating an example of the components of a wearable apparatus according to a disclosed embodiment.

FIG. 10 is a block diagram illustrating an example of the components of a wearable apparatus according to a disclosed embodiment. As shown in FIG. 10, wearable apparatus 110 may include components similar to those depicted in FIGS. 5A, 5B, and 5C. Although not all of the components of wearable apparatus 110 shown in FIGS. 5A, 5B, and 5C are shown in FIG. 10, wearable apparatus 110 shown in FIG. 10 may include any components of wearable apparatus 110 shown in FIGS. 5A, 5B, and 5C. Similarly, any components of wearable apparatus 110 shown in FIG. 10 may be included in any embodiment of wearable apparatus 110 shown in FIGS. 5A, 5B, and 5C. Descriptions of processor 210a and 210b, feedback outputting unit 230, memory 550, and wireless transceiver 530 are similar to those provided above, and thus are not repeated. As shown in FIG. 10, wearable apparatus 110 includes an image sensor 715. Additional sensors may also be included.

Components or features of wearable apparatus 110 shown in different examples in FIGS. 7-9 may be used together in any combination in wearable apparatus 110. For example, one or more microphones 991-993, solar cells 761 and 762, and power unit 770 shown in FIG. 7 may be used in combination with body power harvesting device 810 shown in FIG. 9 (in such a combination, power unit 770 may be combined with power unit 800 or may be separately provided).

As shown in FIG. 10, wearable apparatus 110 may include a power unit 1200, which may be power unit 770 and/or power unit 800. Power unit 1200 may include a battery 1201, which may be similar to battery 771 and battery 805. Additionally or alternatively, power unit 1200 may include an energy storage device 1202. Energy storage device 1202 may or may not be a battery. For example, energy storage device 1202 may be a capacitor. Wearable apparatus 110 may include solar cells 1260, which may include solar cells 761 and 762. Wearable apparatus 110 may include body power harvesting device 810. Solar cells 1260 and body power harvesting device 810 may be electrically connected with power unit 1200 through, for example, wires 1251 and 1252. Power unit 1200 may be electrically connected with image sensor 715 through, for example, a wire 1253. Power unit 1200 may be electrically connected with one or more microphones 991-993 through, for example, a wire 1254 and other wires not shown in FIG. 10. For example, electrical energy converted by solar cells 1260 and/or body power harvesting device 810 may be used to power one or more microphones 991-993.

Figure 11:
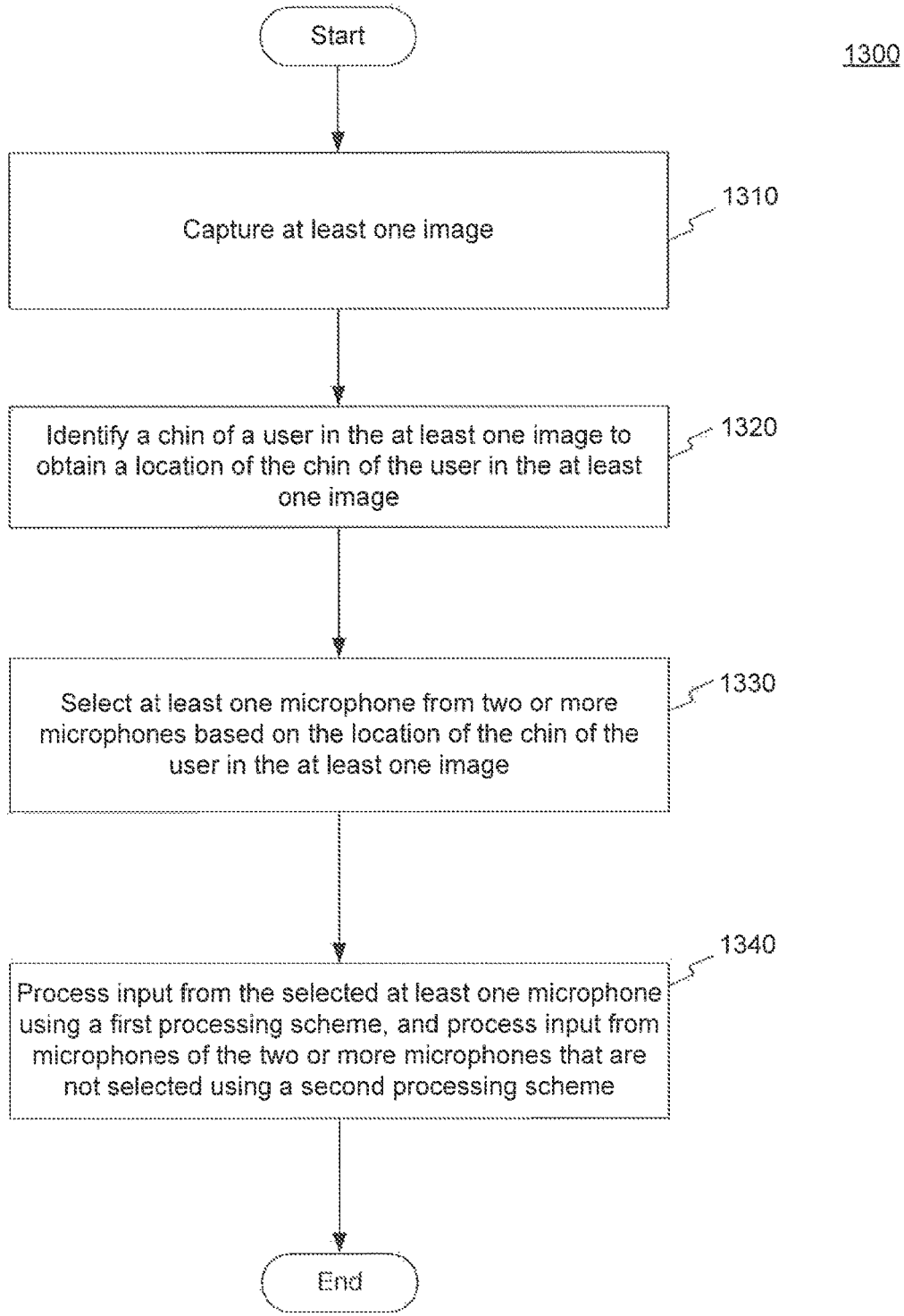
FIG. 11 is a flowchart showing an example method for capturing and processing image data according to a disclosed embodiment.

FIG. 11 is a flowchart showing an example method 1300 for capturing and processing image data according to a disclosed embodiment. Method 1300 may be executed by various devices included in wearable apparatus 110, such as image sensor 220, 220a, 220b, and/or 715, and at least one processing device (e.g., processor 210 and/or processor 540).

Method 1300 may include capturing at least one image of an environment of a user (e.g., user 100) using at least one image sensor included in wearable apparatus 110 that user 100 wears (step 1310). For example, image sensor 715 may capture image data of the environment of user 100, as shown in FIG. 8. The field of view associated with image sensor 715 may include at least a portion of chin 1000 of user 100, as shown in FIG. 8. The image data captured by image sensor 715 may include at least a portion of chin 1000. In some embodiments, the processing device may analyze the image data including the portion of chin 1000. The processing device may analyze two or more sequentially captured image data including chin 1000, and determine that chin 1000 is moving, indicating that user 100 is speaking with someone. It one or more microphones 991-993 are in an idle state, the processing device may turn on or otherwise activate one or more microphones 991-993 after determining that user 100 is speaking with someone.

Method 1300 includes identifying a chin of a user in the at least one image to obtain a location of the chin of the user in the at least one image (step 1320). For example, one or more microphones 991-993 may receive or detect a sound 905, as shown in FIG. 8.

Method 1300 may include selecting at least one microphone from two or more microphones based on the location of the chin of the user in the at least one image (step 1330). In some embodiments, the identified location of chin 1000 in the captured images and/or the estimated direction of chin 1000 may be used to select one or more microphones out of a group of two or more microphones 991-993 attached to a wearable camera (e.g., the camera included in wearable apparatus 110). For example, the microphones may be selected based on a rule associating a direction and/or location with one or more microphones 991-993 to be selected. As another example, the input (e.g., received sound signal) of the selected microphones may be processed using a first processing scheme, while the input coming from the microphones that were not selected may be processed using a second processing scheme. In some embodiments, the first processing scheme may include analyzing the input using a speech to text technique. In some embodiments, the input from the selected microphones may be stored. In some embodiments, the microphones that were not selected may be turned off.

In some embodiments, the identified location of chin 1000 in the captured images and/or the estimated direction of chin 1000 may be used to select a portion of the captured images. For example, the portion of the captured images may be selected based on a rule associating a direction and/or location with one or more regions to be selected. As another example, the selected a portion of the captured images may be processed using a different processing scheme from the processing scheme used on other parts of the captured images. In some embodiments, the selected a portion of the captured images may be stored.

Method 1300 may include processing input from the selected at least one microphone using a first processing scheme, and processing input (e.g., detected or received sound signal) from microphones of the two or more microphones that are not selected using a second processing scheme (step 1340). For example, the first processing scheme may include storing the input from the selected at least one microphone. The second processing scheme may include ignoring the input from the microphones that are not selected. The processing device may execute modules and/or instructions to process the input according to the first and second processing schemes.

Method 1300 may include other steps not listed in the flowchart. For example, method 1300 may include identifying, by the processing device, a portion of the at least one image captured by the at least one image sensor based on the location of the chin of the user and processing the identified portion of the at least one image. Processing the identified portion of the at least one image may include storing the identified portion of the at least one image.

The processing device may identifying a direction of the sound detected by one or more microphones 991-993. For example, as discussed above in connection with FIG. 8, the processing device may analyze sound 905 and determine an angle α of sound 905 with respect to horizontal direction or horizontal line 910.

Method 1300 may include identifying a portion of at least one image captured by image sensor 715 based on the direction of sound 905 (step 1340). For example, the processing device may adjust a resolution of image sensor 715 so that image sensor 715 may capture image data in its field of view including the identified direction with a high resolution. The processing device may analyze a portion of at least one image captured by image sensor 715 regarding second person 902, such as the face of second person 902. In some embodiments, the processing device may analyze an area of interest in the at least one image and may discard image data associated with other areas of the image. For example, the processing device may perform a crop function to reduce the image to be analyzed to a selected area, and discard other areas of the image. Analyzing an area of interest of the image, rather than the entire image, may help reduce the time needed to analyze the image.

In some embodiments, image sensor 715 may capture image data of the environment before user 100, including first person 901 and second person 902. The processing device may identify a portion of at least one image captured by image sensor 715. For example, the processing device may identify chin 1000 of user from an image captured by image sensor 715. From more than one image captured by image sensor 715, the processing device may identify that chin 1000 is moving. Based on the movement of chin 1000, the processing device may determine that user 100 is speaking with someone. The processing device may determine a direction of sound 905 detected by one or more microphones 991-993. The processing device may select an area of interest from an image captured by wide viewing angle image sensor 715 based on the direction of sound 905. For example, sound 905 may have a direction that is to the right of user 100, the processing device may select an area of interest that includes second person 905, who appears to the right of user 100 in the captured image. The processing device may discard image data for the area of the image that is to the left of user 100. The processing device may analyze the selected area of interest of the captured image.

Method 1300 may include processing the identified portion of the at least one image (step 1350). For example, the processing device may cause the identified portion (e.g., chin 1000 of user 100 or area of interest including second person 902) of the at least one image to be stored in image database 601 or any other storage devices. Stored image data may be further analyzed by the processing device to extract information regarding an object (e.g., second person 902) identified from the image data. For example, the processing device may analyze the stored image data of the area of interest including second person 902 to extract information about the facial expression on second person, the hair style of second person 902, the dress second person 902 is wearing, and the actions second person 902 is performing, etc. In some embodiments, processing the identified portion of the at least one image includes storing the identified portion of the at least one image.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A wearable apparatus for capturing image data, the wearable apparatus comprising:
   at least one image sensor for capturing image data of an environment of a user, wherein a field of view of the image sensor includes at least a portion of a chin of the user;
   at least one microphone;
   an attachment mechanism configured to attach the at least one image sensor and the at least one microphone to the user; and
   at least one processing device programmed to:
      identify a chin of the user in the image data to obtain a direction the chin of the user is facing with respect to a body of the user;
      based on the direction the chin of the user is facing, activate the at least one microphone to record sound in the direction the chin is facing;
      identify a direction of sound received by the at least one microphone; and
      after identifying the direction of the sound, adjust a pixel resolution for capturing subsequent image data at a higher resolution.

2. The wearable apparatus of claim 1, wherein the field of view of the at least one image sensor is more than 180°.

3. The wearable apparatus of claim 1, wherein the field of view of the at least one image sensor is more than 300°.

4. The wearable apparatus of claim 1, further comprising at least one solar cell configured to provide power to the image sensor.

5. The wearable apparatus of claim 4, wherein the at least one solar cell is included in a capturing unit that includes the image sensor.

6. The wearable apparatus of claim 1, further comprising a power unit including an energy storage device configured to store energy derived from movements of the user.

7. The wearable apparatus of claim 6, wherein the stored energy is used to power the image sensor.

8. The wearable apparatus of claim 1, wherein the at least one processing device is further programmed to cause the subsequent image data to be stored.

9. The wearable apparatus of claim 1, wherein the at least one processing device is further programmed to transmit the subsequent image data to an external device.

10. A method comprising:
    identifying a chin of a user of a wearable apparatus in image data to obtain a direction the chin of the user is facing with respect to a body of the user;
    based on the direction the chin of the user is facing, activating at least one microphone of the wearable apparatus to record sound in the direction the chin is facing;
    identifying a direction of sound received by the at least one microphone; and
    after identifying the direction of the sound, adjusting a pixel resolution for capturing subsequent image data at a higher resolution.

11. The method of claim 10, further comprising causing the subsequent image data to be stored.

12. A non-transitory computer readable medium storing instructions for carrying out the method of claim 10.

* * * * *